United States Patent [19]

Watanabe

[11] Patent Number: 5,548,413
[45] Date of Patent: Aug. 20, 1996

[54] IMAGE SIGNAL PROCESSING APPARATUS FOR IMAGE SENSOR

[75] Inventor: Hideaki Watanabe, Tokyo, Japan

[73] Assignee: NEC Corporation, Tokyo, Japan

[21] Appl. No.: 248,510

[22] Filed: May 24, 1994

[30] Foreign Application Priority Data

May 24, 1993 [JP] Japan ..................... 5-142537

[51] Int. Cl.$^6$ ..................... H04N 1/40
[52] U.S. Cl. ............. 358/445; 358/446; 358/461
[58] Field of Search ................... 358/445, 446, 358/448, 455, 461, 406, 475, 482, 483

[56] References Cited

U.S. PATENT DOCUMENTS

| | | | |
|---|---|---|---|
| 4,329,717 | 5/1982 | Logie et al. | 358/446 |
| 4,723,174 | 2/1988 | Nishikawa et al. | 358/446 |
| 4,980,778 | 12/1990 | Wittman | 358/446 |
| 5,105,286 | 4/1992 | Sakurai | 358/461 |
| 5,111,311 | 5/1992 | Yamamoto | 358/461 |
| 5,130,822 | 7/1992 | Nagata et al. | 358/461 |
| 5,168,373 | 12/1992 | Nakamura | 358/406 |
| 5,177,621 | 1/1993 | Ohtaki et al. | 358/406 |
| 5,196,948 | 3/1993 | Kasahara et al. | 358/4g333466 |
| 5,253,083 | 10/1993 | Hirota | 358/475 |
| 5,321,524 | 6/1994 | Yanagita | 358/461 |

FOREIGN PATENT DOCUMENTS

| | | |
|---|---|---|
| 61-295763 | 12/1986 | Japan . |
| 63-1159 | 1/1988 | Japan . |
| 4-25286 | 1/1992 | Japan . |
| 4-192668 | 7/1992 | Japan . |
| 4-371073 | 12/1992 | Japan . |

*Primary Examiner*—Edward L. Coles, Sr.
*Assistant Examiner*—Thomas L. Stoll
*Attorney, Agent, or Firm*—Whitham, Curtis, Whitham & McGinn

[57] ABSTRACT

In an image signal processing apparatus, an amplifier for amplifying the output signal of an image sensor and an A/D converter for performing an A/D conversion upon the output signal of the amplifier are provided. When the output signal of the image sensor indicates a white level reference signal, a gain G of the amplifier is controlled so that the output signal of the A/D converter is brought close to a predetermined value. When the gain G reaches its minimum or maximum value, an alarm signal is generated.

23 Claims, 19 Drawing Sheets

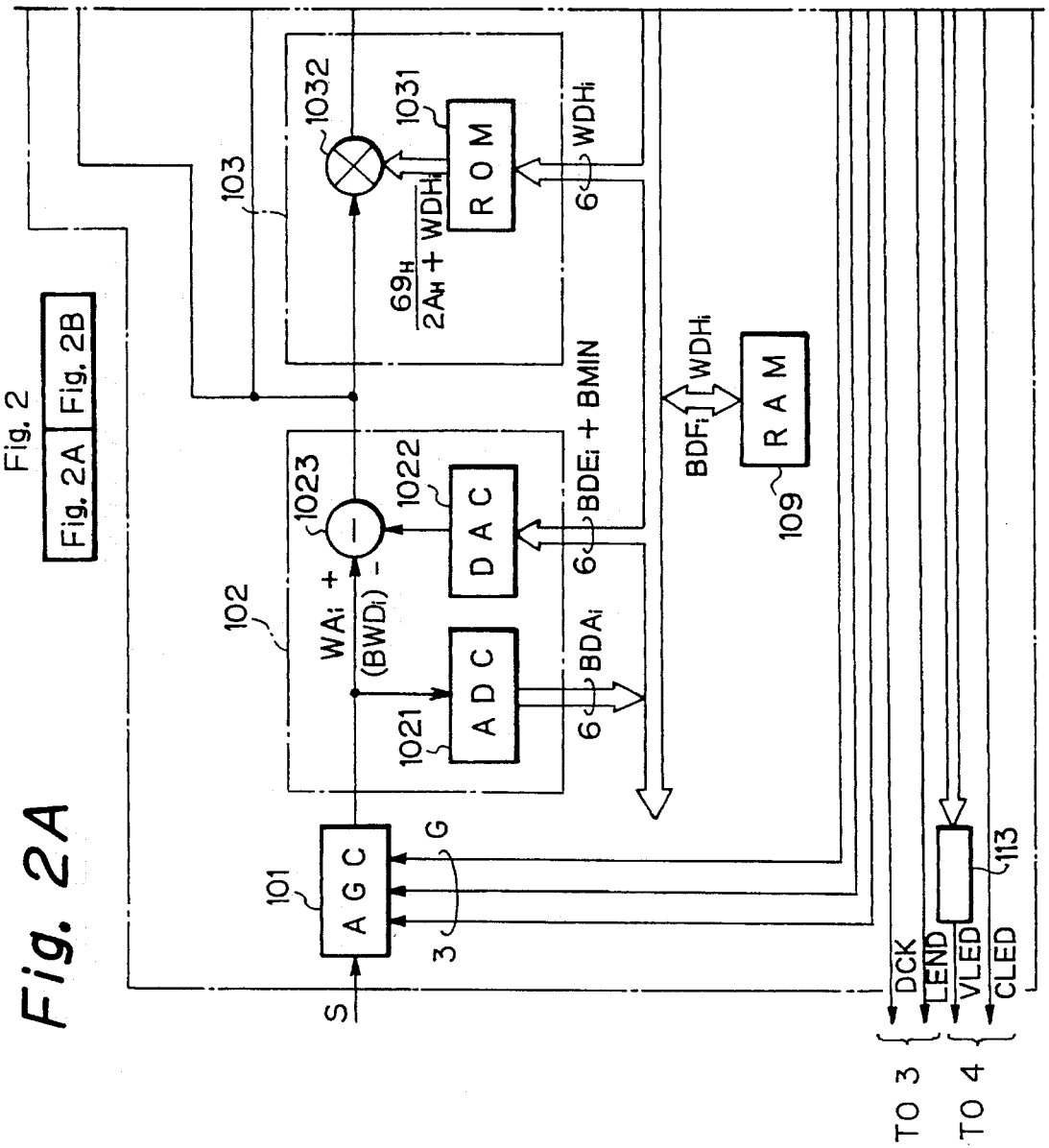

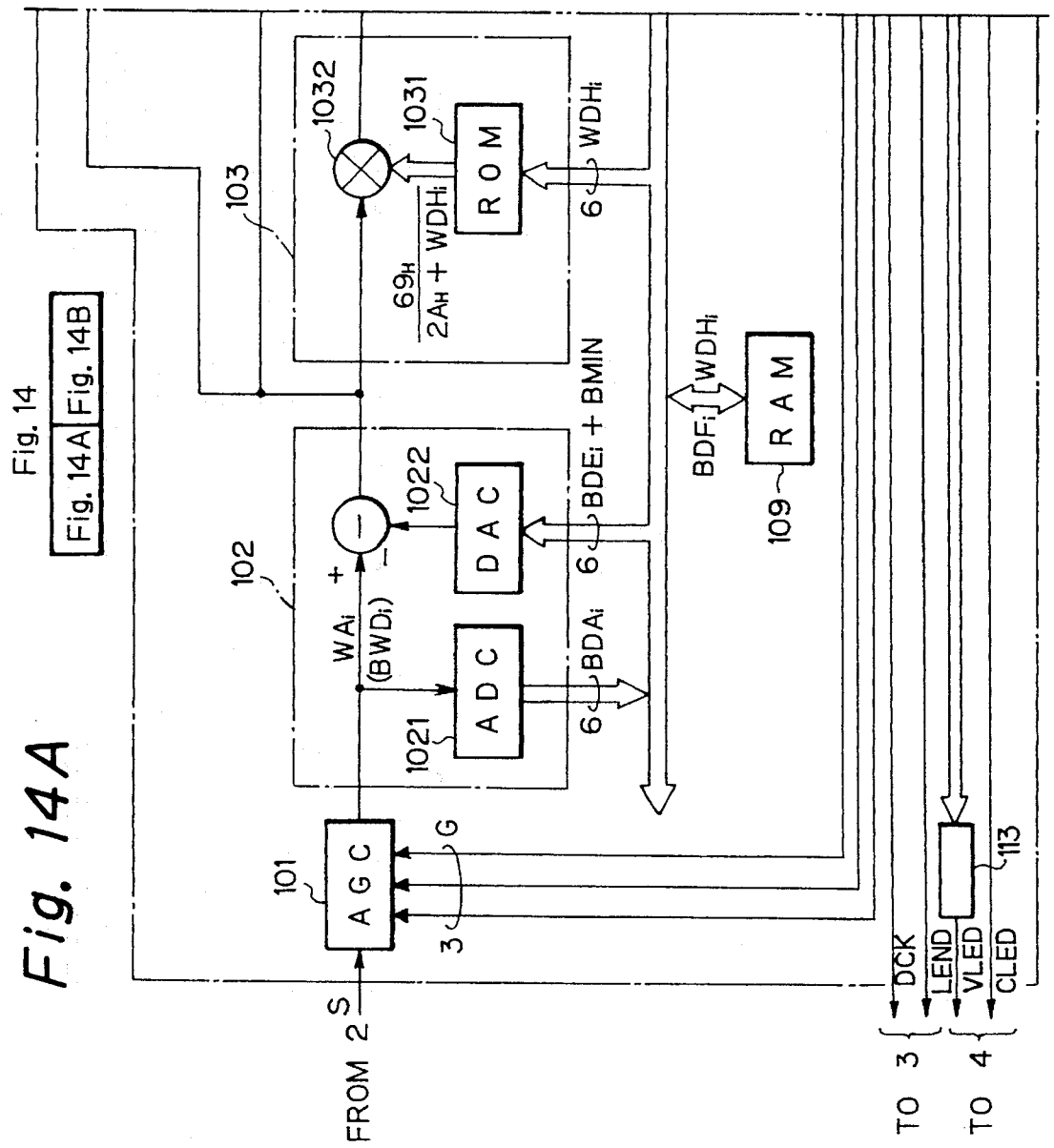

IMAGE SIGNAL PROCESSING APPARATUS FOR IMAGE SENSOR

BACKGROUND OF THE INVENTION

1. Field of the Invention

The present invention relates to an image signal processing apparatus for processing an analog output signal of an image sensor in a facsimile transmitter or an image scanner.

2. Description of the Related Art

In an image signal processing apparatus for an image sensor, there have been known various detection systems for detecting deterioration of the image sensor or the like.

In a first prior art detection system, an analog output signal of the image sensor obtained by scanning a white reference plate is supplied to an analog/digital (A/D) converter After an A/D conversion is carried out, a maximum value is detected by a maximum value detection circuit in an output signal of the A/D converter. Then, the maximum value is compared with a threshold value by a comparator. As a result, when the maximum value is smaller than the threshold value it is determined that a light source or the white reference plate is deteriorated, thus activating an alarm (see JP-A-63-1249).

In a second prior art detection system, also after an A/D conversion is performed upon the analog output signal of the image sensor it is determined whether or not a shading distortion of an effective line due to the deterioration of the light source or the like is smaller than a threshold value. As a result, if the shading distortion is not smaller than the threshold value, i.e., if the shading distortion cannot be corrected, a flip-flop is set so that this shading distortion on can be recognized (see JP-A-2-96474).

A third prior art detection system includes an additional monitoring light receiving element and an additional monitoring light receiving circuit which is connected to an image signal processing apparatus. In a monitoring state, the monitoring light receiving element and the monitoring light receiving circuit are operated, and it is determined whether or not the image signal processing apparatus is normally operated (see JP-A-2-90089).

A fourth prior art detection system provides a means for determining whether or not a document size detecting sensor is abnormal (see JP-A-2-132427).

In any of the above-described prior art detection systems, however, it is impossible to determine an amount of deterioration of the image sensor.

SUMMARY OF THE INVENTION

It is an object of the present invention to provide an image processing apparatus which can determine an amount of deterioration of an image sensor.

Another object of the present invention is to correct the deterioration of the image sensor by using the amount of deterioration of the image sensor.

According to the present invention, in an image signal processing apparatus, an amplifier for amplifying the output signal of an image sensor and an A/D converter for performing an A/D conversion upon the output signal of the amplifier are provided. When the output signal of the image sensor indicates a white level reference signal, a gain G of the amplifier is controlled so that the output signal of the A/D converter is brought close to a predetermined value. When the gain G reaches its minimum or maximum value, an alarm signal is generated. As a result, the amount of deterioration of the image sensor can be corrected by the gain G of the amplifier, and the deterioration of the image sensor can be detected by the alarm signal.

BRIEF DESCRIPTION OF THE DRAWINGS

The present invention will be more clearly understood from the description as set forth below with reference to the accompanying drawings, wherein:

FIG. 2 is a block diagram illustrating a combination of FIGS. 2A and 2B.

FIGS. 2A and 2B detailed block circuit diagrams of the image signal processing apparatus of FIG. 1;

FIG. 14 is a block diagram illustrating a combination of FIGS. 14A and 14B;

FIGS. 14A and 14B are block circuit diagrams of a modification of the image signal processing apparatus FIGS. 2A and 2B;

DESCRIPTION OF THE PREFERRED EMBODIMENT

Figure 1:
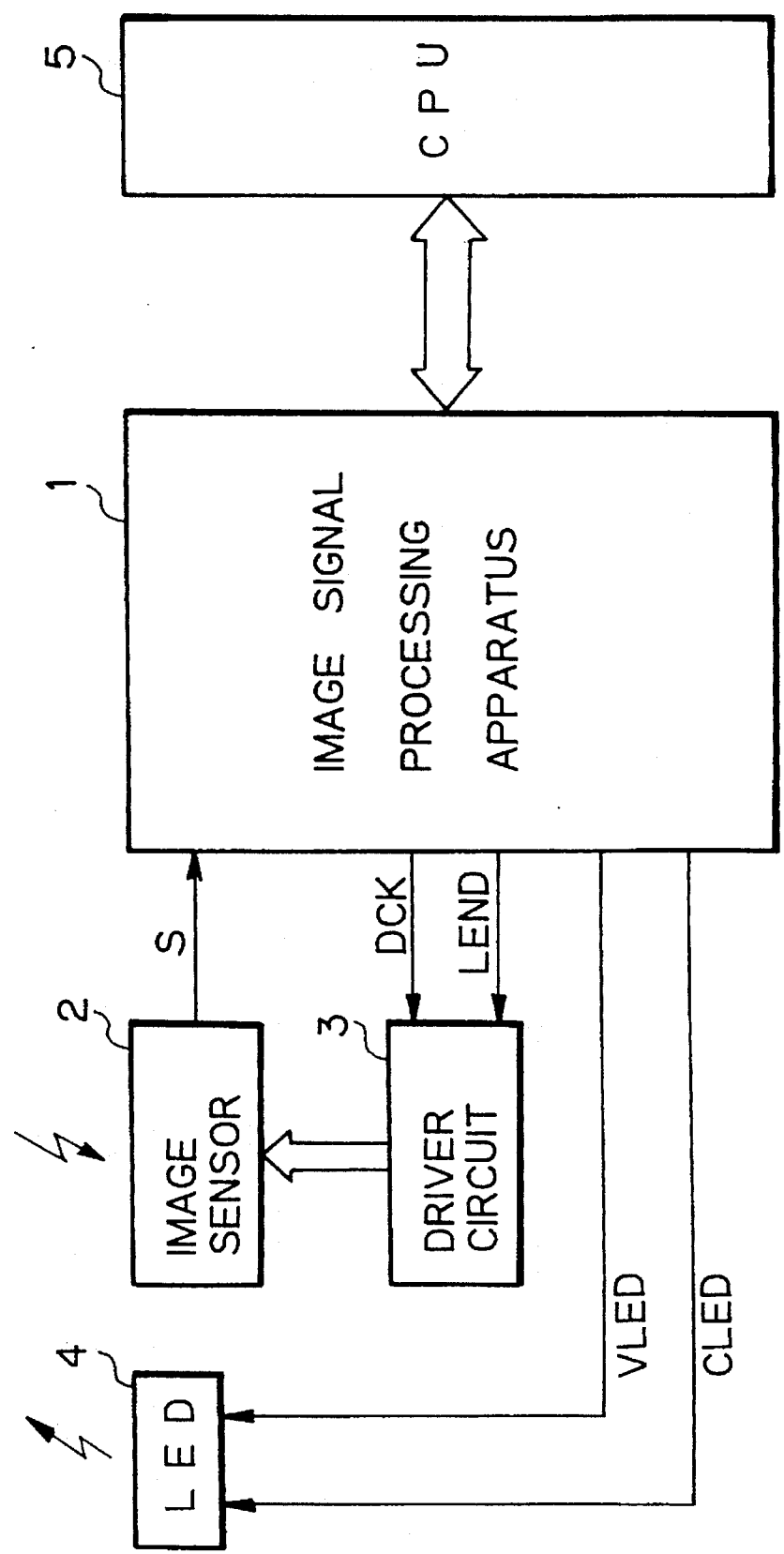
FIG. 1 is a block diagram illustrating a fascimile system including an embodiment of the image signal processing apparatus according to the present invention.

FIG. 1, which illustrates a facsimile system, reference numeral 1 designates an image signal processing apparatus which receives an analog output signal S from an image sensor 2 which is driven by an image sensor driver circuit 3. Light is generated from a light emitting element such as an LED 4. The light is reflected by a white reference plate or a document, and as a result, the reflected light is incident to the image sensor 2.

The image signal processing apparatus 1 generates a clock signal DCK and a line end signal LEND, and transmits them to the image sensor driver circuit 3. Therefore, since a counter (not shown) of the image sensor driver circuit 3 is counted up by the clock signal DCK and is cleared by the line end signal LEND, the image sensor driver circuit 3 can perform a scanning operation off the image sensor 2.

Also, the image signal processing apparatus 1 applies a predetermined voltage VLED to the LED 4 and supplies a control signal CLED to the LED 4, to thereby turn the LED 4 ON and OFF.

A central processing unit (CPU) 5 is connected to the image signal processing apparatus 1. The CPU 5 controls not only the the image signal processing apparatus, but also the other units (not shown) of the facsimile system.

Figure 2B:
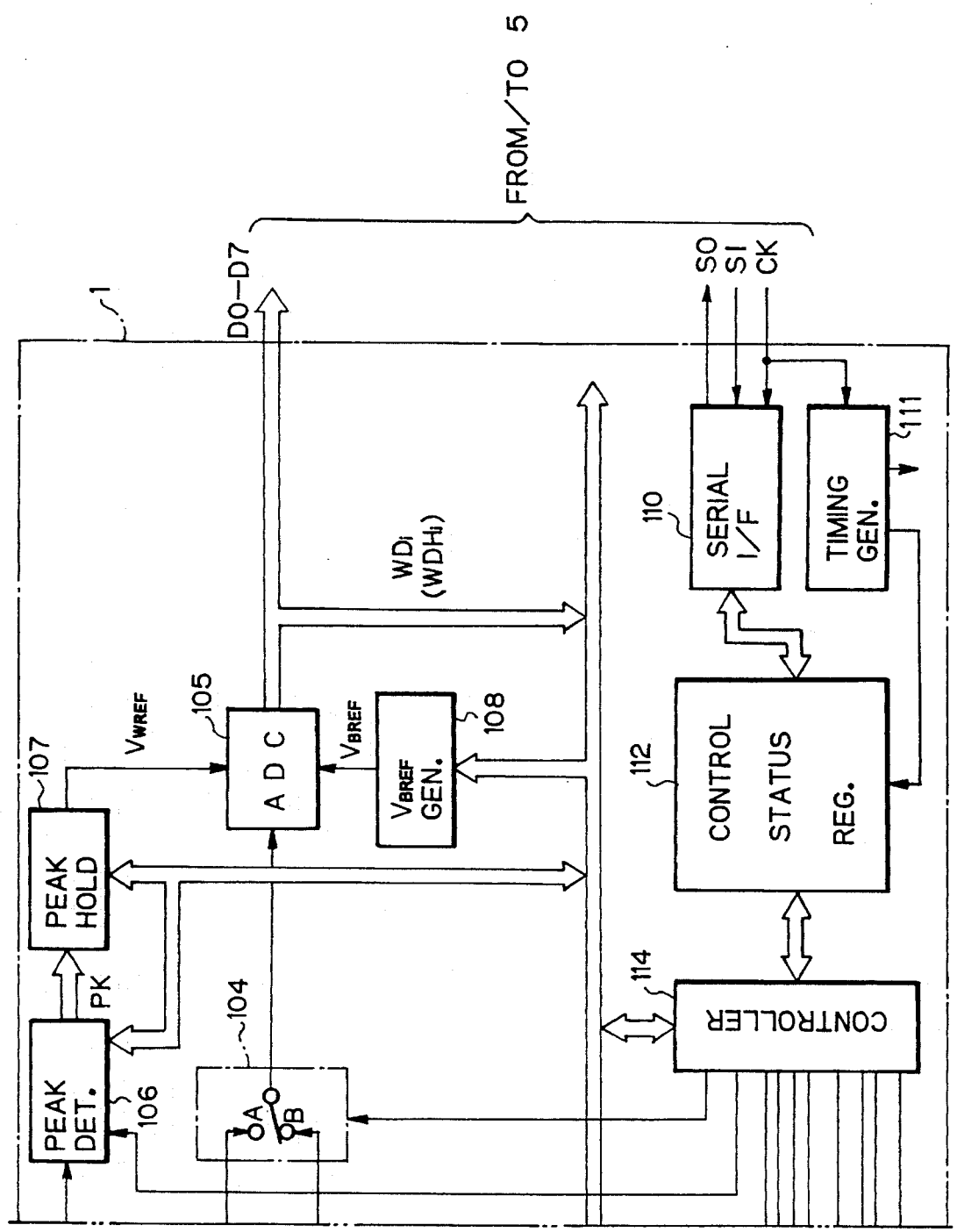

FIG. 2, which is a detailed block circuit diagram of the image signal processing apparatus 1 off FIG. 1, reference numeral 101 designates an amplifier, i.e., an automatic gain control (AGC) circuit which includes an analog switch and a capacitor for regenerating the analog output signal of the image sensor 2. The gain G of the AGC circuit 101 is represented by 3 bits, for example, to control the bias resistor thereof.

The output of the AGC circuit 101 is connected to a black level correction circuit 102 for correcting a black level of each pixel of the image sensor 1. The black level correction circuit 102 includes an A/D converter 1021, connected to the AGC circuit 101, for converting an output signal of the AGC circuit 101 into a digital value $BDA_i$, a D/A converter 1022 for generating a sum of a black level correction value $BDE_i$ and a minimum value BMIN, and a substractor 1023 for subtracting the output of the D/A converter from the output of the AGC circuit 101, to thereby generate a pixel signal corrected by the black level correction value $BDE_i$ and the minimum value BMIN.

The output of the black level correction circuit 102 is connected to a white level correction circuit 103 for correcting a white level of each pixel of the image sensor 2. The white level correction circuit 103 includes a converter such as a read-only memory (ROM) 1031 for converting a white level correction value $WDH_i$ into a value $69_H/(2A_H+WDH_i)$, and an analog multiplier 1032 which multiplies the output of the black level correction circuit 102 by the value $69_H/(2A_H+WDH_i)$. Note that $69_H$ (hexadecimal notation)= $105 \approx 100$ and $2A_H$ (hexadecimal notation)=$42 \approx 40$. This will be explained later in detail. Also, the analog multiplier 1032 is formed by an operational amplifier which has 128 different resistors and 128 switches controlled by a 6 bit output signal of the ROM 1031 ($128=2^7$). That is, in the analog multiplier 1032, the switches are turned ON and OFF in accordance with the 6 bit value of the ROM 1031, and therefore, 128 different multiplications can be carried out.

The output of the black level correction circuit 102 and the output of the white level correction circuit 103 are connected via a switch 104 to an 8-bit A/D converter 105. That is, when the switch 104 is at an upper position A, the output of the black level correction circuit 102 is supplied to the A/D converter 105. This state is used in a white level correcting operation. On the other hand, when the switch 104 is at a lower position B, the output of the white level correction circuit 103 is supplies to the A/D converter 105. This state is used in a normal operation.

Also, the output of the black level correction circuit 102 is connected to a peak detection circuit 106 and a peak hold circuit 107 which generates a white reference supply voltage $V_{WREF}$ and applies it to the A/D converter 105. On the other hand, a $V_{BREF}$ generating circuit 108 generates a black reference supply voltage $V_{BREF}$ and applies it to the A/D converter 105 is a range from $V_{BREF}$ to $V_{WREF}$.

Reference 109 designates a random access memory (RAM) which stores the black level correction value $BDE_i$ and the white level correction value $WDH_i$ for each pixel. However, note that a 3-bit black level correction value $BDF_i$ is actually stored in the RAM 109 instead of the 6 bit black level correction value $BDE_i$, in order to reduce the size of the RAM 109, which will be explained later in detail.

Reference numeral 110 designates a serial interface (I/F) which transmits a serial data signal SO to the CPU 5 and receives a serial data signal SI and a clock signal CK from the CPU 5. Also, the clock signal CK is supplied to a timing clock generating circuit 111 which generates various timing clock signals.

Connected to the serial interface 110 is a control status register 112 which stores control information and the like.

Reference numeral 113 designates a voltage generating circuit for generating the voltage VLED applied to the LED 4, to thereby control the intensity of the LED 4.

Reference numeral 114 designates a controller (sequencer) for controlling all of the image signal processing apparatus 1 in accordance with the content of the control status register 112. For this purpose, the controller 114 is connected to all of the units within the image signal processing apparatus 1 except for the serial interface 110. The controller 114 generates the clock signal DCK and the line end pulse LEND for the image sensor driver circuit 3.

The operation of the image signal processing apparatus 1, i.e., the controller 114 and the CPU 5 will be explained next with reference to FIG. 3.

Figure 3:
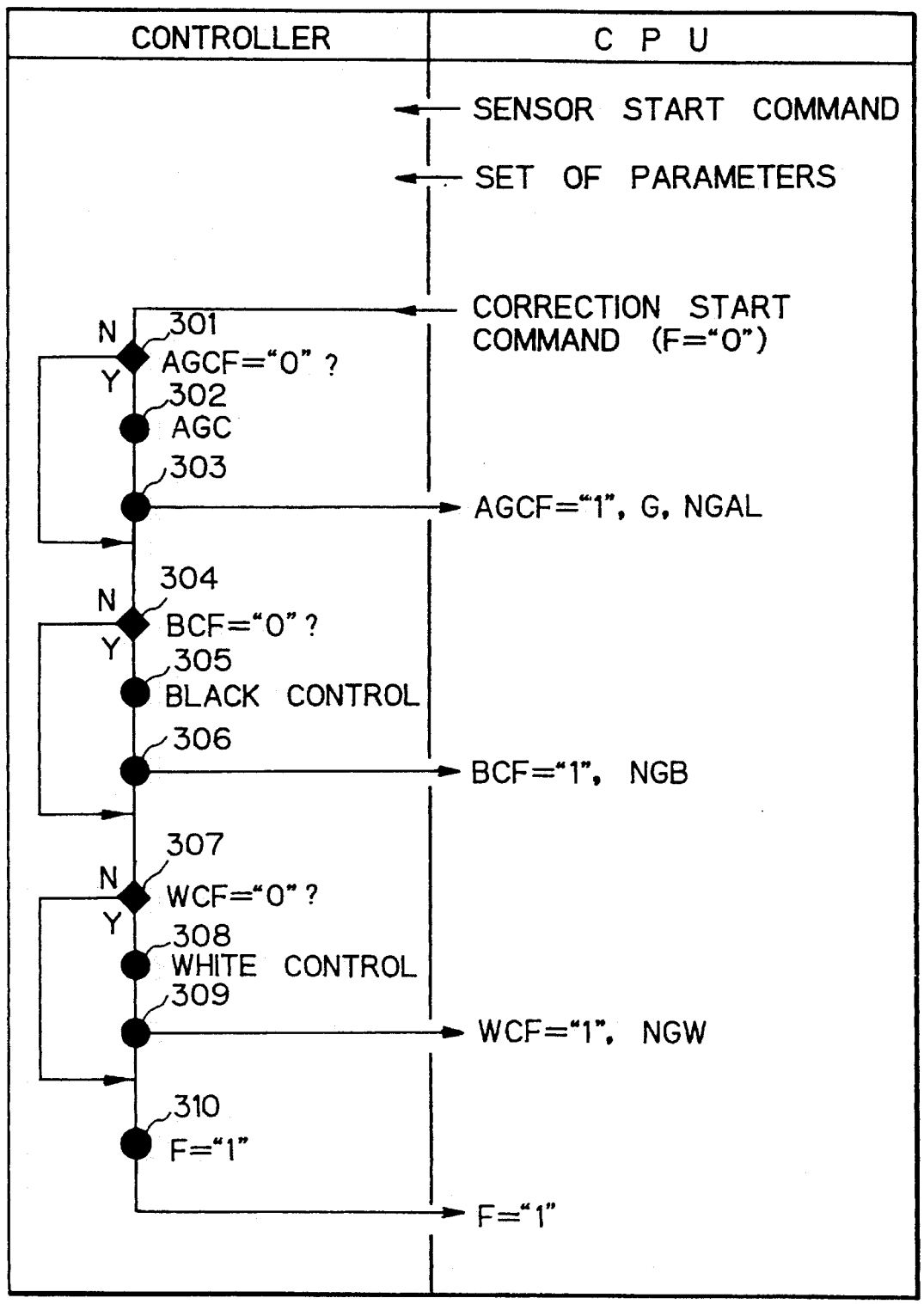
FIG. 3 is a flowchart of the operation of the image signal processing apparatus and the CPU of FIG. 1.

In FIG. 3, first, the CPU 5 generates a sensor start command and various parameters such as the LED voltage VLED, a mode parameter MOD, an AGC flag AGCF, a black level correction flag BCF, a white level correction flag WCF, and the like, and transmits them as the serial data signal SI to the serial interface 110. As a result, the sensor start command and the parameters are stored in the control status register 112. Note that the mode parameter MOD is used in determination of effective bits of the black level correction value $BDE_i$. Also, when the flag AGCF is "0", an automatic gain control is carried out, and when the antomatic gain control is completed, the flag AGCF is made "1". Similarly, when the flag BCF is "0", a black level correction control is carried out, and when the black level correction control is completed, the flag BCF is made "1". Further, when the flag WCF is "0", a white level correction control is carried out, and when the white level correction control is completed, the flag WCF is made "1".

When the correction start command, i.e., a flag F(="0") generated by the CPU 5 is set in the control status register 112, the controller 114 enters step 301.

At step 301, it is determined whether or not the AGC flag AGCF is "0". Only when AGCF="0", does the control proceed to step 302 which carries out an automatic gain control which will be explained later in detail. Otherwise, the control proceeds directly to step 304. After the automatic gain control is completed, at step 303, the controller transmits the flag AGCF, a gain value G, and an alarm flag NGAL via the control status register 112 and the serial interface 110 to the CPU 5.

At step 304, it is determined whether or not the black level correction flag BCF is "0". Only when BCF="0", does the control proceed to step 305 which carries out a black level correction control which will be explained later in detail. Otherwise, the control proceeds directly to step 307. After the black level correction control is completed, at step 306, the controller trausmits the flag BCF, and a number NGB of defective black pixels via the control status register 112 and the serial interface 110 to the CPU 5.

At step 307, it is determined whether or not the white level correction flag WCF is "0". Only when WCF="0", the control proceeds to step 308 which carries out a white level correction control which will be explained later in detail. Otherwise, the control proceeds directly to step 310. After the white level correction control is completed, at step 309, the controller transmits the flag WCF, and a number NGW of defective white pixels via the control status register 112 and the serial interface 110 to the CPU 5.

Then, at step 310, the flag F is made "1", and the controller 114 transmits the flag F via the control status register 112 and the serial interface 110 to the CPU 5.

Figure 4:
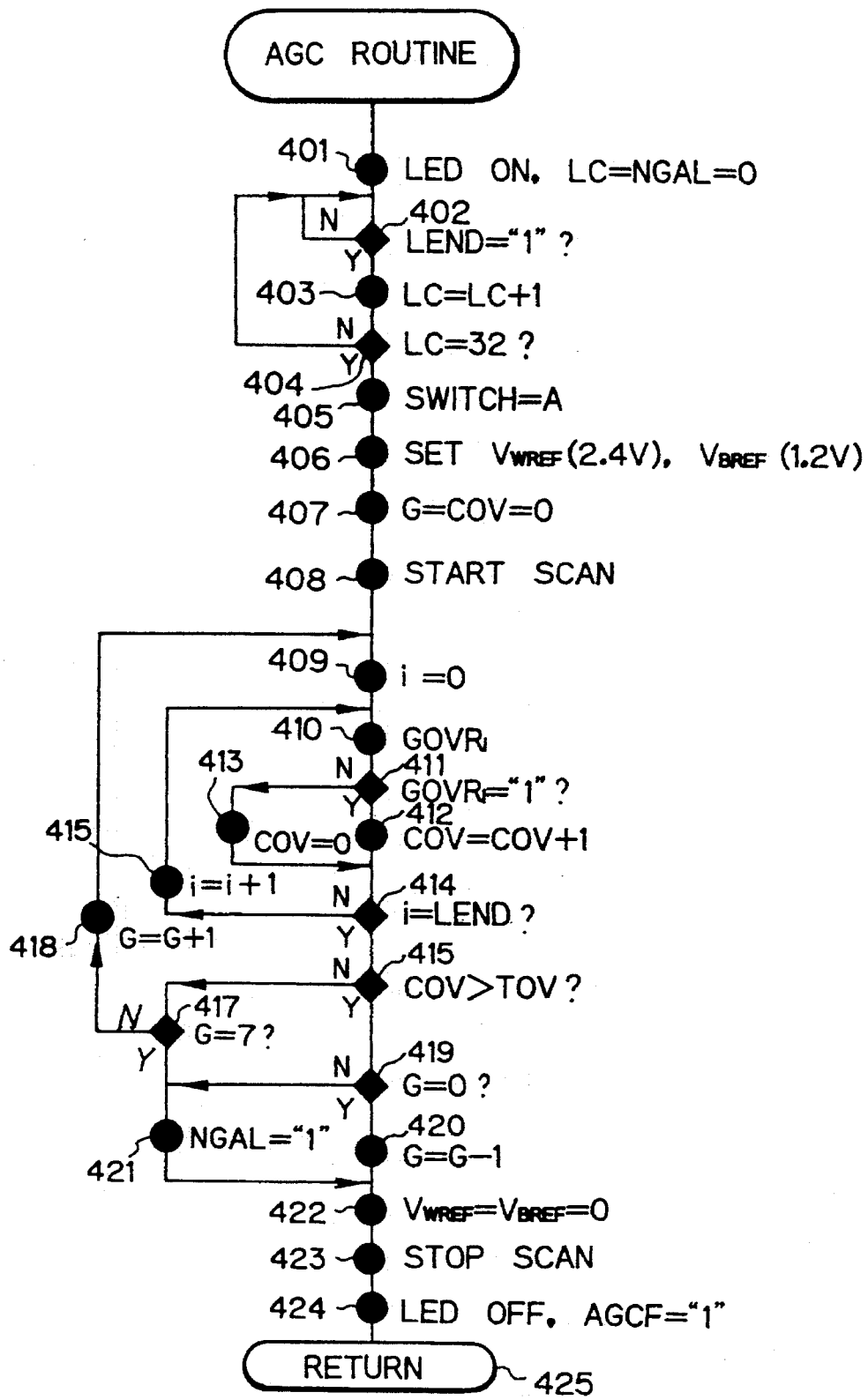
FIG. 4 is a detailed flowchart of the AGC control step of FIG. 3.

FIG. 4, which is a detailed flowchart of the AGC step 302 of FIG. 3, at step 401, the LED control signal CLED is made "1" to turn ON the LED 4. Also, a line counter LC and the alarm flag NGAL are cleared. At steps 402, 403 and 404, in order to secure a response time of the image sensor 2, the control waits until the value of the line counter LC reaches 32. That is, at step 402, it is determined whether or not a line end pulse LEND is "1". Only when the line end pulse LEND is "1", does the control proceed to step 403 which increases the value of the line counter LC. Then, at step 404, it is determined whether or not the value of the line counter LC reaches 32. As a result, only when the value of the line counter LC reaches 32, does the control proceed to step 405.

At step 405, the switch 104 is at the upper position A, so that the output of the black level correction circuit 102 is connected to the A/D converter 105. In this case, note that the D/A converter 1022 of the black level correction circuit 102 is not operated, so that the output of the AGC circuit 101 per se is supplied to the A/D converter 105.

At step 406, the white reference supply voltage $V_{WREF}$ and the black reference supply voltage $V_{BREF}$ are determined. In this case, the value of the peak hold circuit 107 is made $7F_H$ (=127), so that the white reference supply voltage $V_{WREF}$ is 2.4 V. On the other hand, the value of the $V_{BREF}$ generating circuit 108 is made $0_H$ (=0), so that the black reference supply voltage $V_{BREF}$ is 1.2 V. Thus, the A/D converter 105 is operated, and its output voltage is in a range from 1.2 V to 2.4 V.

At step 407, the gain G of the AGC circuit 101 and a value of an overflow counter COV for counting successive overflows are cleared.

At step 408, scanning of a white reference plate is initiated to obtain output values $DA_i$ (i=0~LEND) of the A/D converter 105. Note that since the clock signal DCK and the the line end pulse LEND are generated from the controller 114, an i-th pixel signal in the output of the A/D converter 105 can be recognized by the controller 114.

At step 409, a value i is cleared.

At step 410, it is determined whether or not an overflow occurs, i.e., whether or not $DA_i > 66_H$ (=102). If two successive values $DA_i$ and $D_{i+1}$ are larger than $66_H$, a value $GOVR_i$ is made "1". Otherwise, the value $GOVR_i$ is made "0".

Then, at step 411, it is determined whether or not the value $GOVR_i$ is "1". Only when $GOVR_i$="1", does the control proceed to step 412 which counts up the value of the overflow counter COV by +1. Otherwise, at step 413, the overflow counter COV is cleared. The control at steps 410 through 413 are repeated by steps 414 and 415 until the value i reaches LEND.

At step 416, it is determined whether the value of the overflow counter COV is larger than a predetermined value TOV. As a result, if COV≤TOV, the control proceeds via step 417 to step 418 which increases the gain G of the AGC circuit 101 by +1, thus repeating the control at steps 409 though 416. On the other hand, if COV≦TOV, the control process via step 419 to step 420 which decreases the gain G of the AGC circuit 101 by 1.

Note that the gain G of the AGC circuit 101 is represented by 3 bits as stated before, so that a maximum value of the gain G is 7 and a minimum value of the gain G is 0. Therefore, the gain G is guarded by steps 417 and 420.

Also, at step 419, if the gain G is 0, this means that it is impossible to control the gain G of the AGC circuit 101. Therefore, in this case, at step 421, the alarm flag NGAL is set (NGAL="1").

At step 422, the reference supply voltages $V_{WREF}$ and $V_{BREF}$ are made 0, thus stopping the operation of the A/D converter 105.

At step 423, the scanning operation of the white reference plate is completed.

At step 424, the control voltage CLED is made 0, to thereby turn OFF the LED 4. Also, the AGC flag AGCF is made "1".

Then, at step 425, this routine returns to step 303 of FIG. 3.

Then, as explained above, at step 303, the AGC flag AGCF, the gain G and the alarm flag NGAL are transmitted to the CPU 5.

Figure 5:
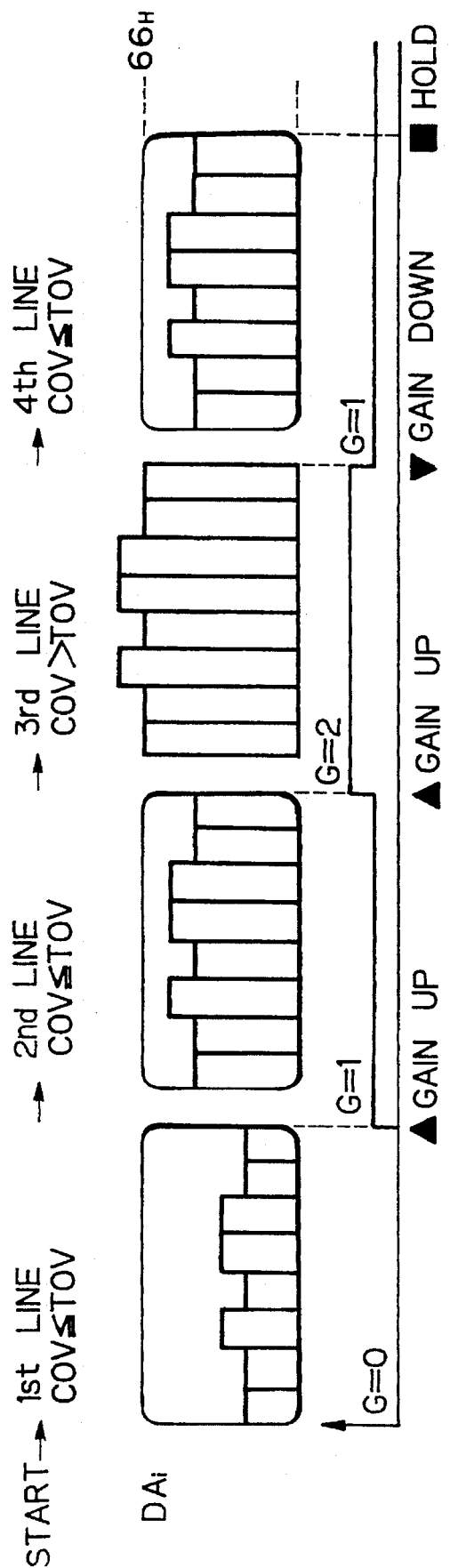
FIG. 5 is a timing diagram explaining the flowchart of FIG. 4.

An example of the gain G of the AGC circuit 101 determined by the routine of FIG. 4 is shown in FIG. 5. In FIG. 5, when a first line is scanned at G=0, the value of the overflow counter COV is not larger than TOV. Therefore, a second line is scanned at G=1. Also, in this case, the value of the overflow counter COV is not larger than TOV, and therefore, a third line is scanned at G=2. In this case, however, the value of the overflow counter COV is larger than TOV. Therefore, the gain G is decreased by step 420, and thereafter, the gain G is held. That is, the gain G of the AGC circuit 101 is controlled so that the output signal $DA_i$ of the A/D converter 105 is close to a predetermined value such as $66_H$. In this case, if the gain G is a minimum value such as 0 or a miximum value such as 7, the AGC circuit 101 cannot be controlled, thus generating an alarm by setting the alarm flag NGAL.

Figure 6:
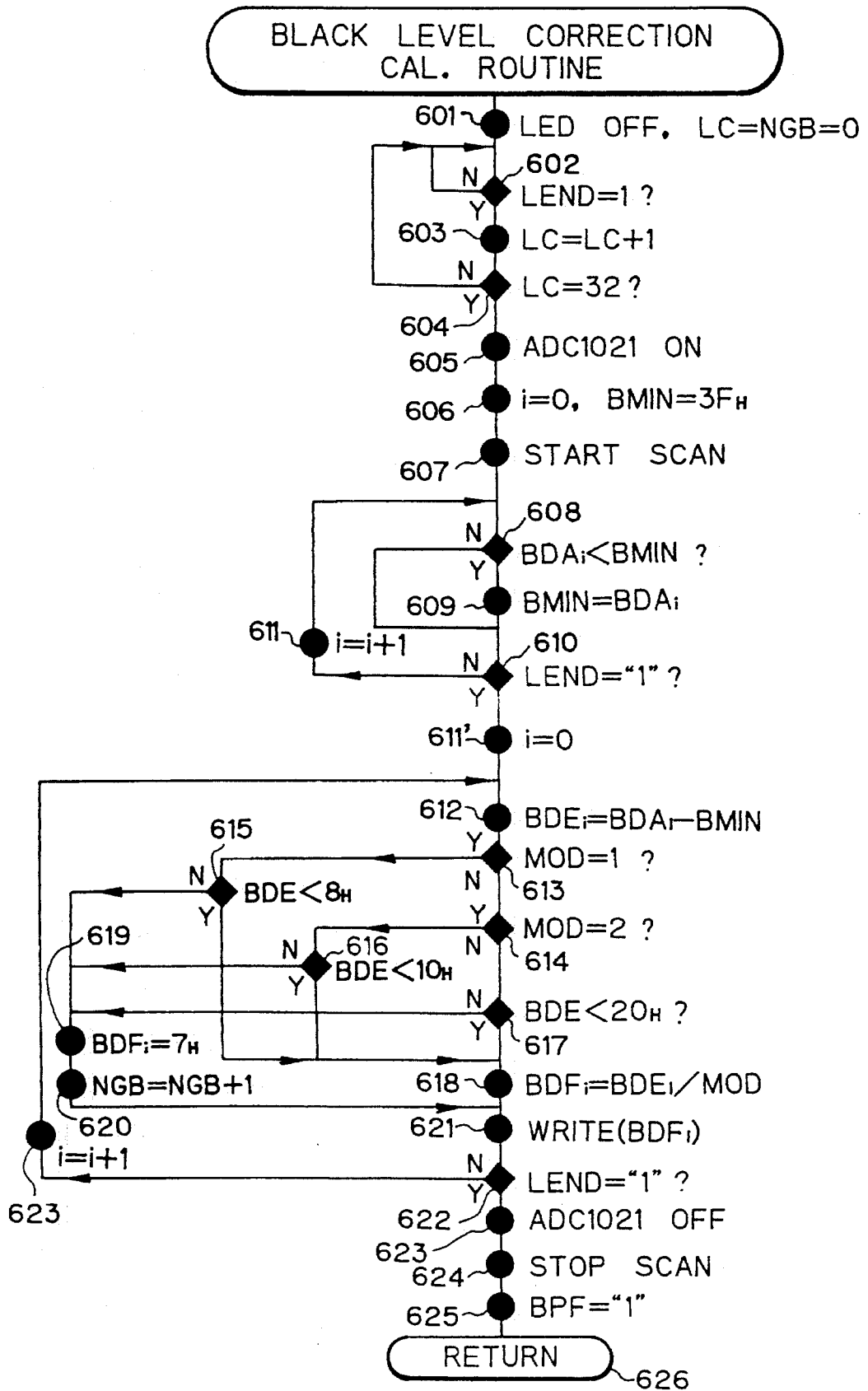
FIG. 6 is a detailed flowchart of the black level correction calculating step 305 of FIG. 3.

In FIG. 6, which is a detailed flowchart of the black level correction calculating step 305 of FIG. 3, at step 601, the LED control signal CLEG is made "0" to turn OFF the LED 4. Also, a line counter LC and a defective black level number counter NGB are cleared. At steps 602, 603 and 604, in order to secure a response time of the image sensor 2, the control waits until the value of the line counter LC reaches 32. That is, at step 602, it is determined whether or not a line end pulse LEND is "1". Only when the line end pulse LEND is "1", does the control proceed to step 603 which increases the value of the line counter LC. Then, at step 604, it is determined whether or not the value of the line counter LC reaches 32. As a result, only when the value of the line counter LC reaches 32, does the control proceed to step 605.

At step 605, the A/D converter 1021 is operated, and at step 606, the value i is cleared and an initial value of a black level minimum BMIN is made $3F_H$(=63).

At step 607, scanning of a black reference signal is initiated to obtain output values $BDA_i$ (i=0~LEND) of the A/D converter 1021. Note that the A/D converter 1021 is a 6-bit A/D converter.

At steps 608 through 611, the black level minimum value BMIN is renewed. That is, at step 608, it is determined whether or not $BDA_i$<BMIN, and as a result, only when $BDA_i$<BMIN, does the control proceed to step 609 which replaces the value BMIN with $BDA_i$. Steps 610 and 611 repeat the control at steps 608 and 609 until scanning of one line is completed.

At steps 611 through 623, a scanning operation for one line is again carried out, so that black level correction values $BDE_i$, effective black level correction values $BDF_i$, and a number NGB of defective black pixels are calculated. Note that, each of the black level correction values $BDE_i$ is formed by 6 bits, while each of the effective black level correction values $BDF_i$ is formed by 3 bits. Therefore, the effective black level correction values $BDE_i$ instead of the black level correction values $BDE_i$ are stored in the RAM 109, to thereby reduce the size of the RAM 109.

In more detail, at step 611, the value i is cleared.

At step 612, the black level correction value $BDE_i$ is calculated by $$BDE_i = BDA_i - BMIN$$

Then, at steps 612, 613 and 614, the mode parameter MOD, which is already set by the CPU 5 in the control status register 112, is read therefrom. Then, it is determined whether the mode parameter MOD is 1, 2 or 4. As a result, if MOD=1, the control proceeds to step 615 which determines whether or not $BDE_i < 8_H (=8)$. Also, if MOD=2, the control proceeds to step 616 which determines whether or not $BDE_i < 10_H (=16)$. Further, if MOD=4, the control proceeds to step 617 which determines whether or not $BDE_i < 20_H (=32)$.

At steps 615, 616 and 617, when the determination is affirmative, the control proceeds to step 618 which calculates the effective black level correction value $BDF_i$ by $$BDF_i = BDE_i / MOD$$

Figure 7:
FIG. 7 is a timing diagram explaining the flowchart of FIG. 6.

In this case, the effective black level correction value $BDF_i$ is obtained by shifting three valid bits of the black correction value $BDE_i$ in accordance with the mode parameter MOD, as shown in FIG. 7.

On the other hand, at steps 615, 616 and 617, when the determination is negative, the control proceeds to step 619 which guards the effective black level correction value $BDF_i$ by its maximum value $7_H (=7)$. In addition, at step 620, the defective black pixel number NGB is counted up by +1.

At step 621, the controller 114 stores the effective black level correction value $BDF_i$ in the RAM 109.

Steps 612 through 621 are repeated by steps 622 and 623 until scanning of one line is completed.

At step 622, the operation of the A/D converter 1021 is stopped.

At step 623, the scanning operation of the black reference signal is completed.

At step 624, the scanning of the black reference signal is stopped.

At step 625, the black level correction flag BPF is made "1".

Then, at step 626, this routine returns to step 306 of FIG. 3.

Then, as explained above, at step 306, the black level correction flag BPF and the defective black pixel number NGB are transmitted to the CPU 5.

Figure 8:
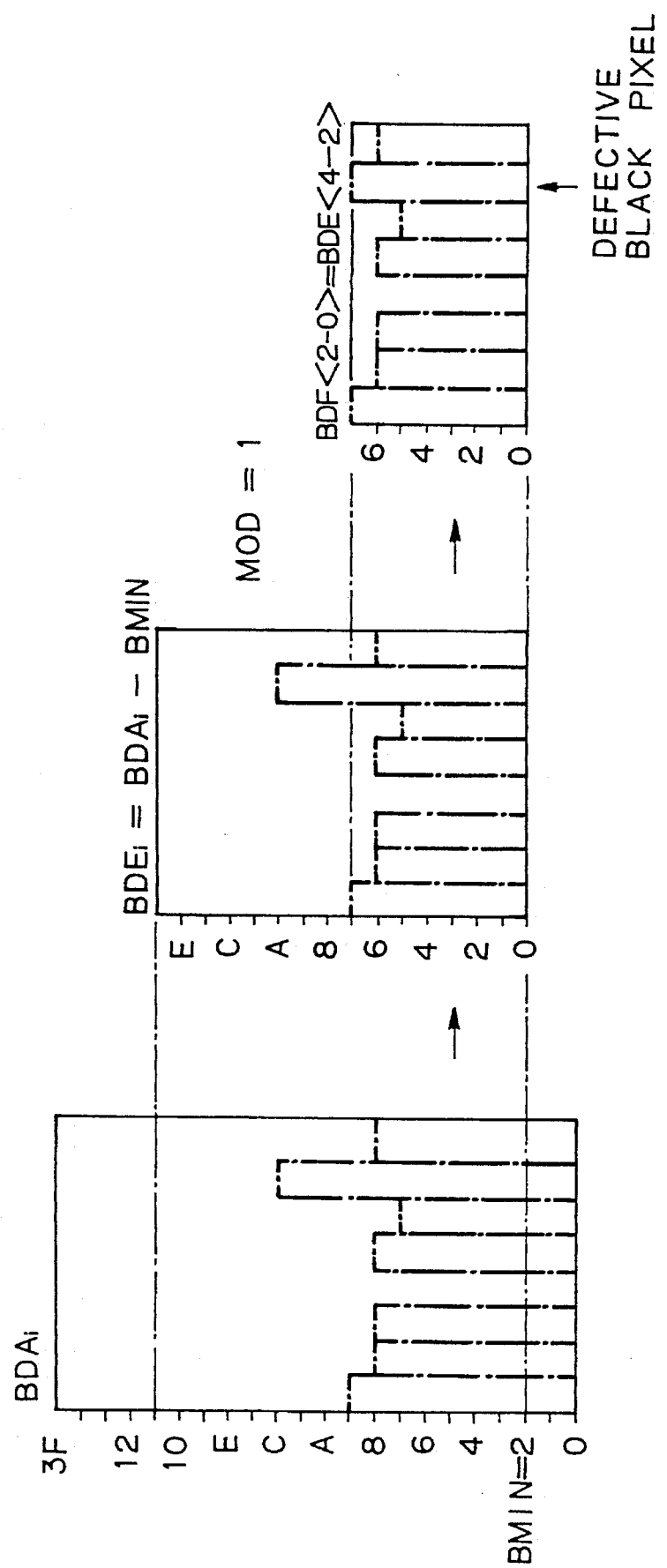
FIG. 8, 9 and 10 are timing diagrams explaining the mode parameters of FIG. 6.

In the case of MOD=1, as shown in FIG. 8, the black level correction value $BDE_i$ is calculated by the output value $BDA_i$ of the A/D converter 1021 and its minimum value BMIN, and the black level correction value $BDE_i$ (6 bits) is changed to the effective black level correction value $BDF_i$ (3 bits). In this case, if $BDE_i \geq 8_H$, the pixel with the value $BDE_i$ is defective.

Figure 9:
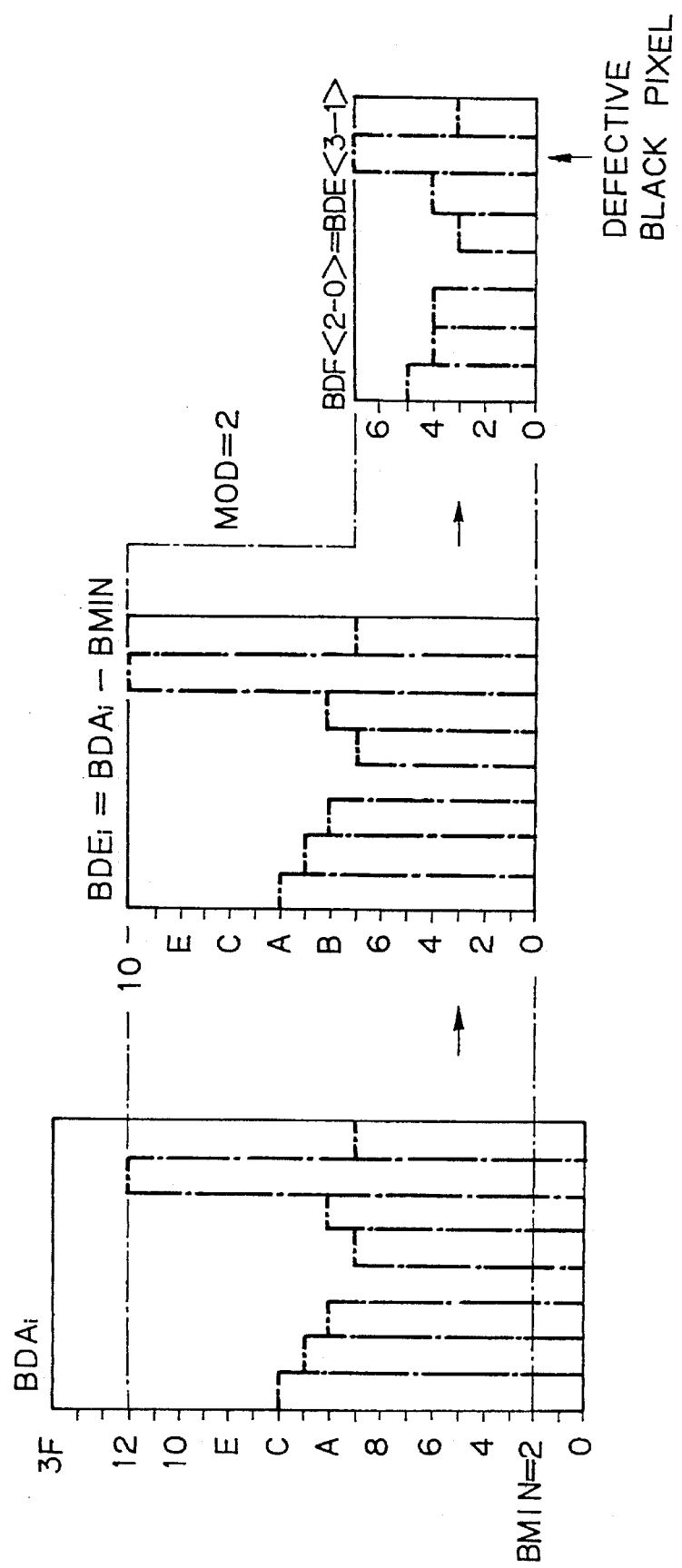

In the case of MOD=2, as shown in FIG. 9, the black level correction value $BDE_i$ is also calculated by the output value $BDA_i$ of the A/D converter 1021 and its minimum value BMIN, and the black level correction value $BDE_i$ (6 bits) is changed to the effective black level correction value $BDF_i$ (3 bits). In this case, if $BDE_i \geq 10_H$, the pixel with the value $BDE_i$ is defective.

Figure 10:
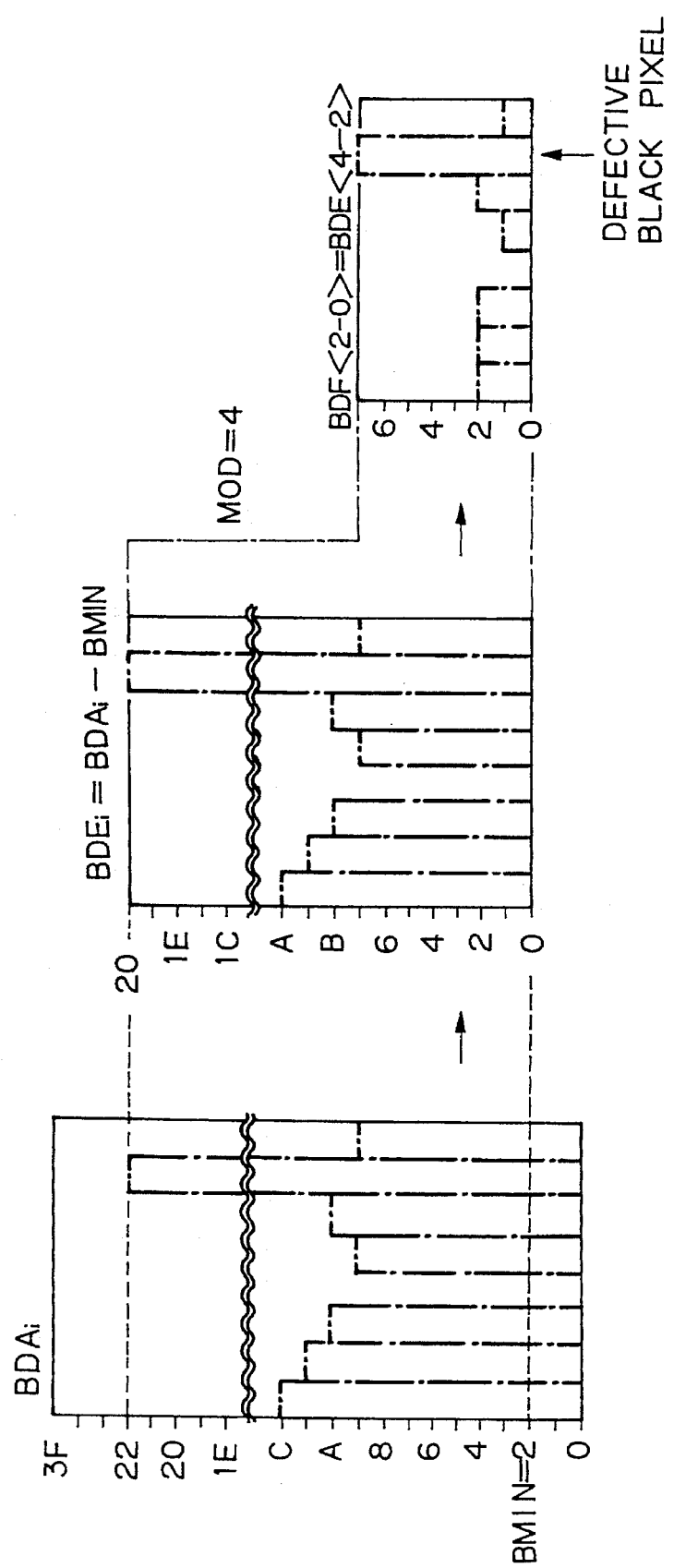

In the case of MOD=4, as shown in FIG. 10, the black level correction value $BDE_i$ is also calculated by the output value $BDA_i$ of the A/D converter 1021 and its minimum value BMIN, and the black level correction value $BDE_i$ (6 bits) is changed to the effective black level correction value $BDF_i$ (3bits). In this case, if $BDE_i \geq 20_H$, the pixel with the value $BDE_i$ is defective.

Figure 11A:
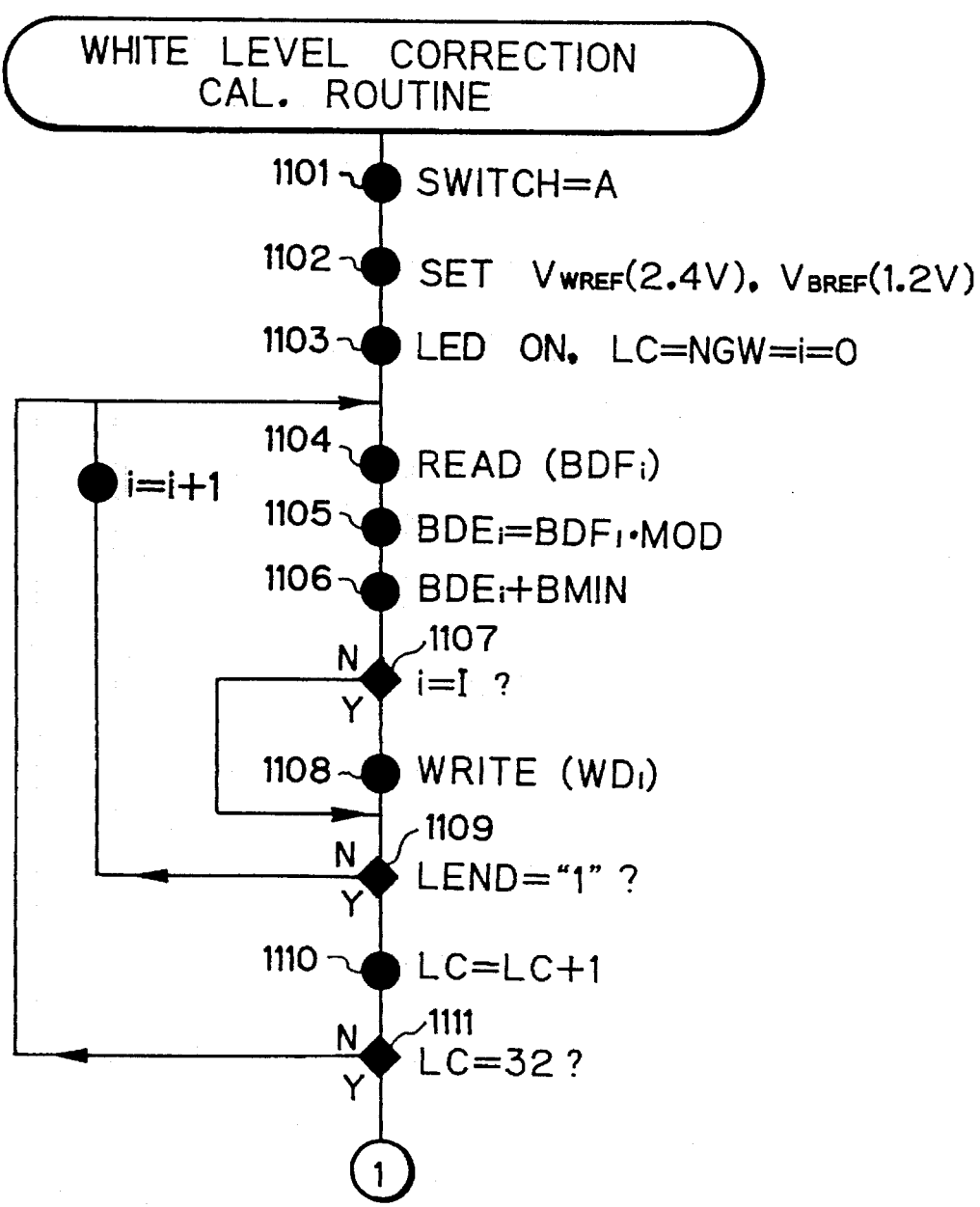
FIGS. 11A, 11B and 11C are detailed flowcharts of the white level correction calculating step 308 of FIG. 3.
Figure 11B:
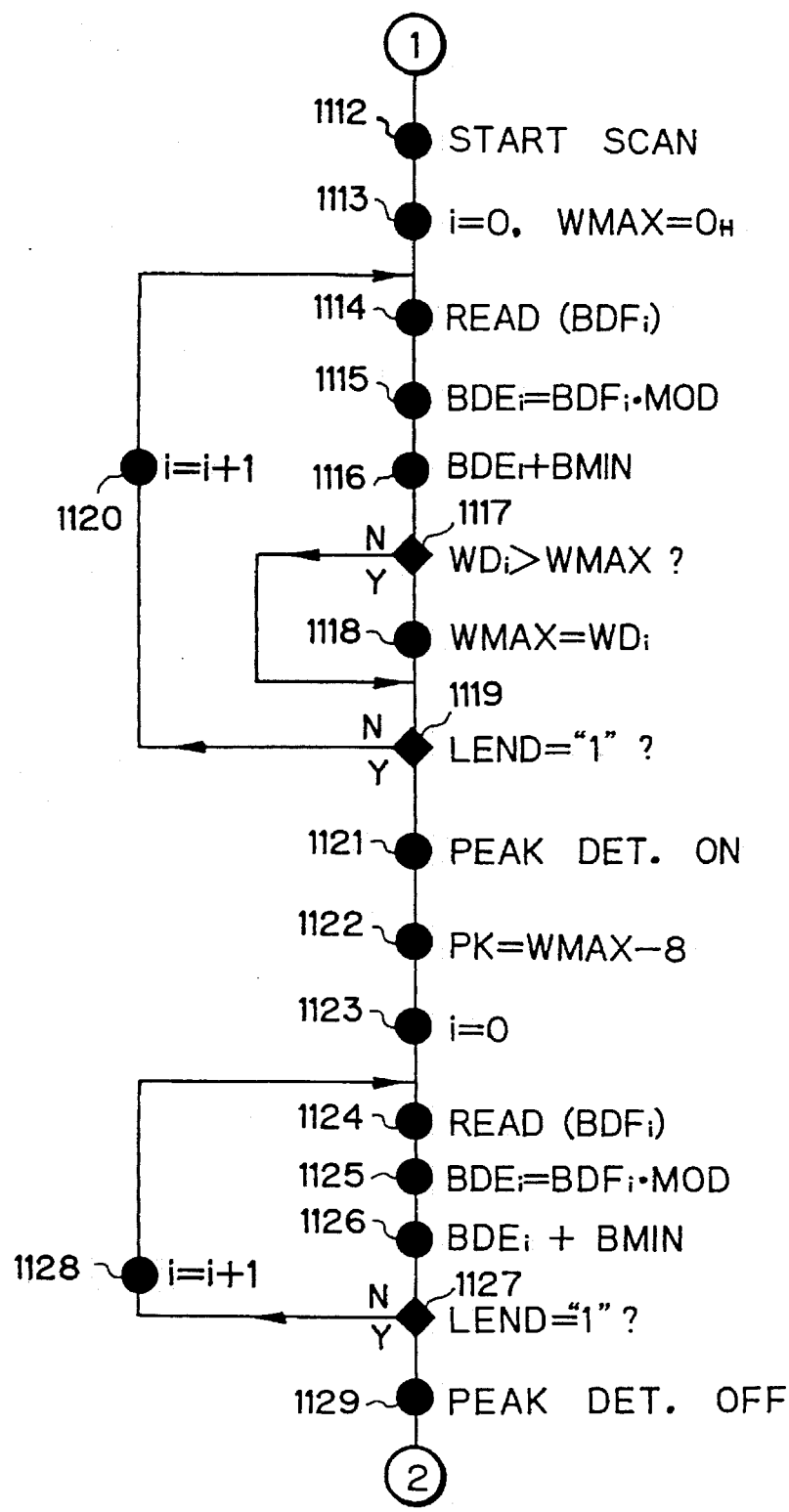
Figure 11C:
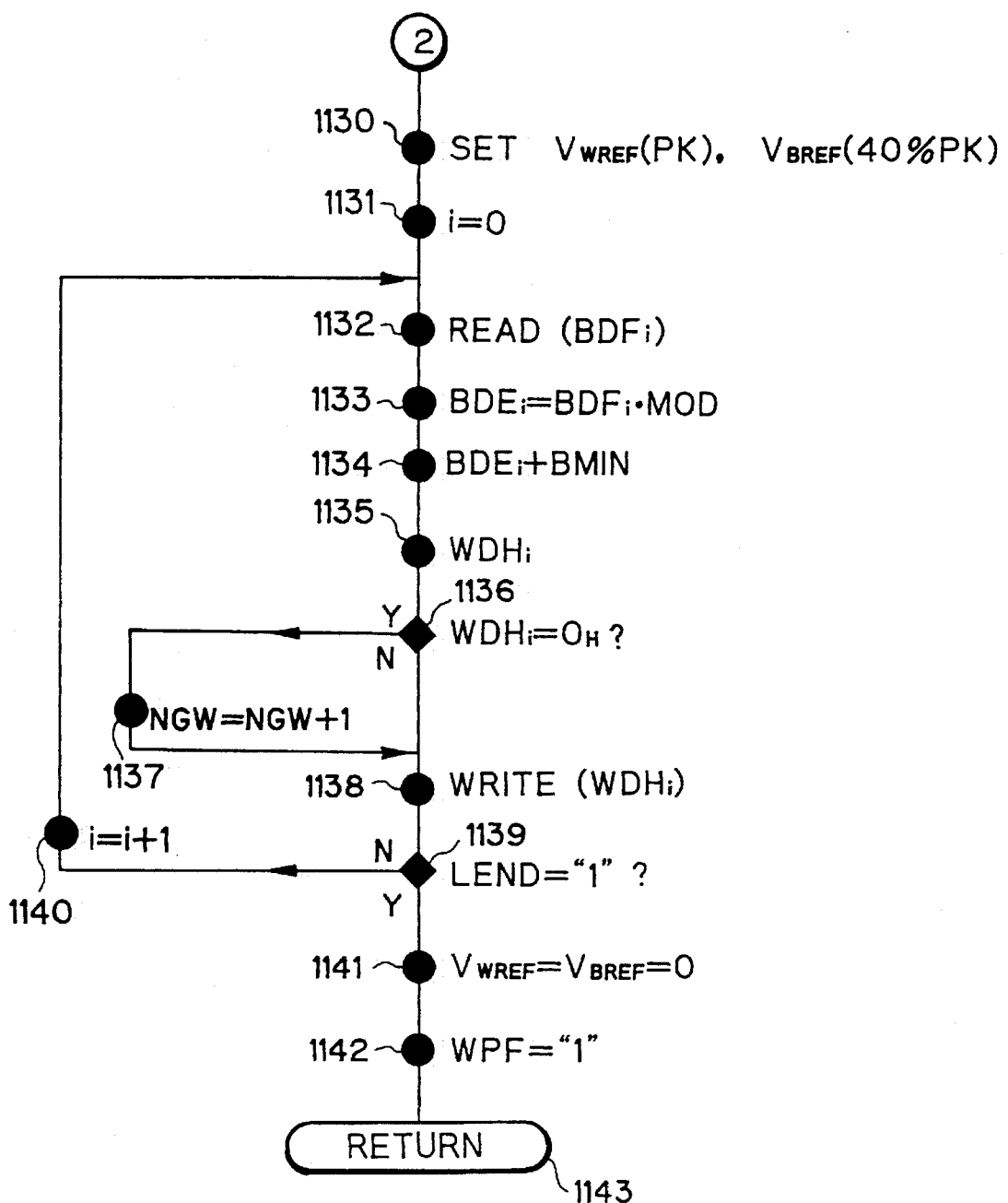

In FIG. 11A, 11B and 11C, which is a detailed flowchart of the white level correction step 309 of FIG. 3, at step 1101, the switch 104 is at the upper position A, so that the output of the black level correction circuit 102 is connected to the A/D converter 105.

At step 1102, the white reference supply voltage $V_{WREF}$ and the black reference supply voltage $V_{BREF}$ are determined. In this case, the value of the peak hold circuit 107 is made $7 F_H (=127)$, so that the white reference supply voltage $V_{WREF}$ is 2.4 V. On the other hand, the value of the $V_{BREF}$ generating circuit 108 is made $0_H (=0)$, so that the black reference supply voltage $V_{BREF}$ is 1.2 V. Thus, the A/D converter 105 is operated, and its output voltage is in a range from 1.2 V to 2.4 V.

At step 1103, the LED control signal CLED is made "1" to turn ON the LED 4. Also, a line counter LC, a defective white pixel number NGW and the value i cleared.

At step 1104, the controller 114 read the effective black level correction value $BDF_i$ (3 bits) from the RAM 109, and at step 1105, the controller 114 calculates the black level correction value $BDE_i$ (6 bits) by $$BDE_i = BDF_i \cdot MOD$$

Then, at step 1106, the controller 114 calculates a sum of $BDE_i$ and BMIN and transmits it to the D/A converter 1022. As a result, the subtractor 1023 calculates $$AWD_i = WA_i - A(BDE_i + BMIN)$$

where $WA_i$ is an output signal of the AGC circuit 101 when the output signal is a white reference signal; and $A(BDE_i + BMIN)$ is an analog value of the digital value of $BDE_i + BMIN$. The analog output $AWD_i$ of the subtractor 1023 is converted by the A/D converter 105 into a digital value $WD_i$.

Figure 12:
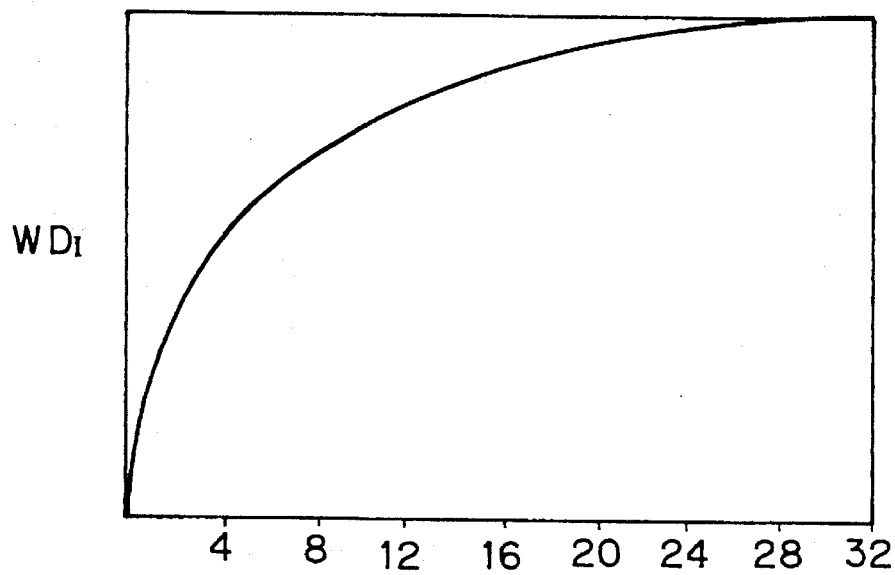
FIG. 12 is a graph showing an example off a response characteristic of the image sensor determined by the routine of FIG. 11A.

The I-th data $WD_I$ of each line is written into the RAM 109 by steps 1108 and 1109, and the data $WD_I$ of 32 lines are written into the RAM 109 by steps 1110 and 1111. In this case, the values $WD_I$ represent a response characteristic of the image sensor 2. An example of the values $WD_I$ is shown in FIG. 12.

In steps 1112 through 1119, a maximum value WMAX is detected in the output signal $WD_i$ of the D/A condition that $V_{WREF}=2.4$ V and $V_{BREF}=1.2$ V. That is, at step 1112, a scanning operation is started by generating the signals DCK and LEND. At step 1113, the value i and the maximum value WMAX are cleared. Then, at step 1114, the controller 114 reads the effective black level correction value $BDF_i$ (3 bits) from the RAM 109, and at step 1115, the controller 114 calculates the black level correction value $BDE_i$ (6 bits) by $$BDE_i = BDF_i \cdot MOD$$

Then, at step 1116, the controller 114 calculates a sum of $BDE_i$ and BMIN and transmits it to the D/A converter 1022.

As a result, the subtractor 1023 calculates $$AWD_i=WA_i-A(BDE_i+BMIN).$$

The analog output $AWD_i$ of the subtractor 1023 is converted by the A/D converter 105 into a digital value $WD_i$. Then, at step 1117, it is determined whether or not $WD_i$>WMAX. Only when $WD_i$>WMAX, does the control proceed to step 1118 which replaces the maximum value WMAX with the value $WD_i$. Steps 1114 through 1118 are repeated by steps 1119 and 1120 until scanning of one line is completed.

In steps 1121 through 1129, a peak value PK is detected by the peak detection circuit 106 on an initial condition that WMAX-8 is set in the peak detection circuit 106. That is, at step 1121, the peak detection circuit 106 is operated, and at step 1122, the value WMAX-8) is initially set in the peak detection circuit 106. At step 1123, the value i is cleared. Then, at step 1124, the controller 114 reads the effective black level correction value $BDF_i$ (3 bits) from the RAM 109, and at step 1125, the controller 114 calculates the black level correction value $BDE_i$ (6 bits) by $$BDE_i=BDF_i \cdot MOD$$

Then, at step 1126, the controller 114 calculates a sum of $BDE_i$ and BMIN and transmits it to the D/A converter 1022. As a result, the subtractor 1023 calculates $$AWD_i=WA_i-A(BDE_i+BMIN).$$

The analog output $AWD_i$ of the subtractor 1022 is supplied to the peak detection circuit 106. Steps 1124 through 1126 are repeated by steps 1127 and 1128 until scanning of one line is completed. As a result, the peak value PK of the peak detection circuit 106 may be renewed. This peak value PK is held in the peak hold circuit 107.

In steps 1130 through 1140, a white level correction value $WDH_i$ is calculated under the condition that $V_{WREF}$=PK and $V_{BREF}$=40% PK. That is, at step 1130, the peak hold circuit 107 is fixed, so that the white reference supply voltage $V_{WREF}$ equals PK. Also, 0.4×PK is set in the $V_{BREF}$ generating circuit 108, so that the black reference supply voltage $V_{BREF}$ equals 0.4 ·PK.

At step 1132, the value i is cleared. Then, at step 1132, the controller 114 reads the effective black level correction value $BDF_i$ (3 bits) from the RAM 109, and at step 1133, the controller 114 calculates the black level correction value $BDE_i$ (6 bits) by $$BDE_i=BDF_i \cdot MOD$$

Then, at step 1134, the controller 114 calculates a sum of $BDE_i$ and BMIN and transmits it to the D/A converter 1022. As a result, the subtractor 1023 calculates $$AWD_i=WA_i-A(BDE_i+BMIN).$$

The analog output $AWD_i$ of the subtractor 1023 is converted by the A/D converter 105 into a digital value $WDH_i$. At step 1136, it is determined whether or not WDH i=$0_H$. When $WDH_i=0_H$, does the control proceed to step 1137 in which the defective white pixel number NGW is counted up by +1. Steps 1130 through 1138 are repeated by steps 1139 and 1140 until scanning of one line is completed.

At step 1141, the operation of the A/D converter 105 is stopped.

At step 1142, the white level correction flag WPF is made "1".

Then, at step 1143, this routine returns to step 309 of FIG. 3.

Then, as explained above, at step 309, the white level correction flag WPF and the defective black pixel number NGW are transmitted to the CPU 5.

After all of the gain G of the AGC circuit 101, the black level correction values $BDE_i$, the black level minimum value BMIN, and the white level correction values $WDH_i$ are determined, the controller 114 generates the values $BDE_i$+BMIN and $WDH_i$ for each pixel signal $BWD_i$, so that the output signal of the white level correction circuit 103 is $$BWD_i \cdot 69_H/(2A_H+WDH_i)$$

where $69_H$ is approximately 100 which corresponds to the peak level PK; and $2A_H$ is approximately 40 which corresponds to 0.4·PK.

Figure 13:
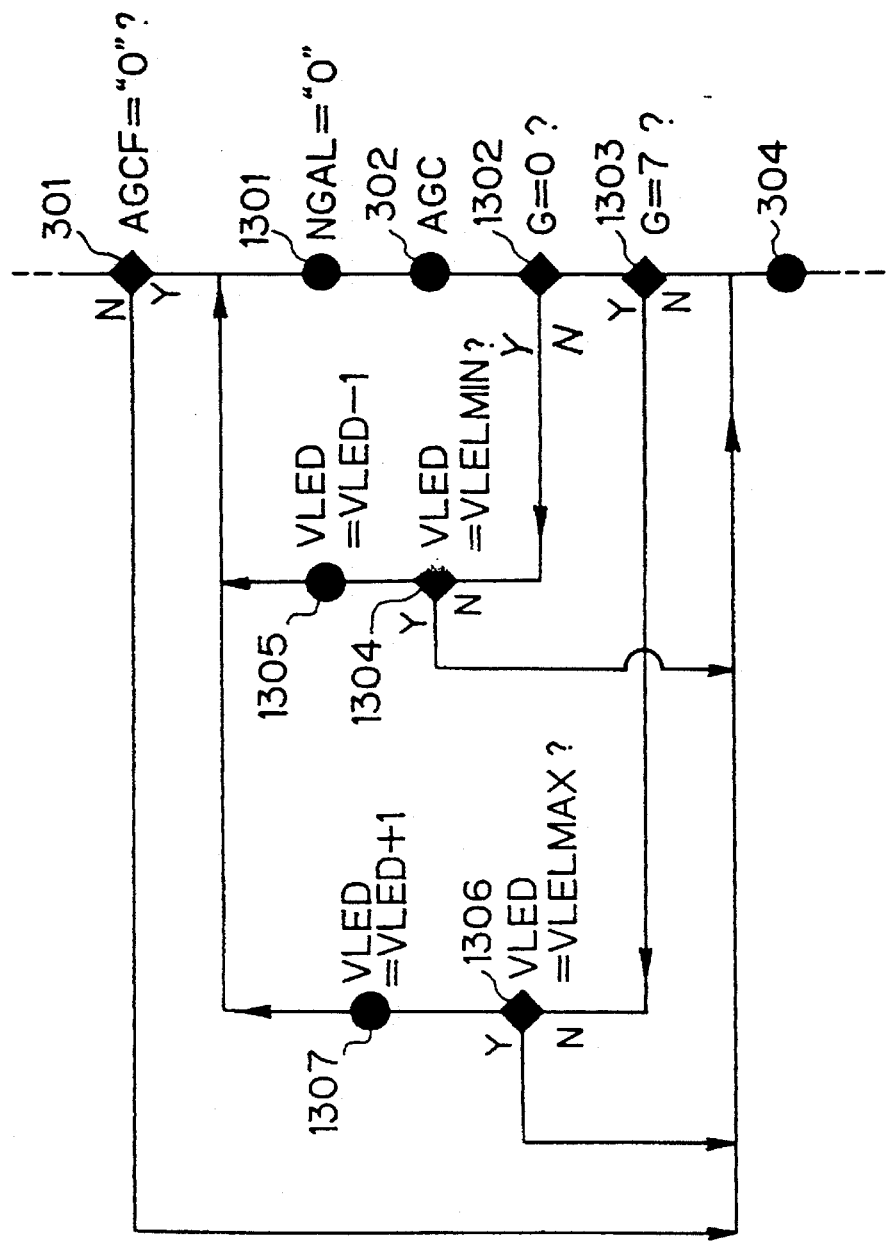
FIG. 13 is a flowchart of a modification of the flowchart, of FIG. 3.

In FIG. 13, which is a modification of the flowchart of FIG. 3, steps 1301 through 1307 are added to FIG. 3. That is, when the control proceeds from step 301 to step 1301 which resets the alarm flag NGAL (NGAL="0"). Then, at step 302, the automatic gain control is carried out in the same way as in the routine of FIG. 4. Then, at step 1302, it is determined whether or not the gain G of the AGC circuit 101 is a minimum value which is, in this case, 0. Also, at step 1303 it is determined whether or not the gain G of the AGC circuit 101 is a maximum value which is, in this case, 7.

As a result, at step 1302, when GG=0, the control proceeds to step 1304, so that it is determined whether or not the LED voltage VLED is its minimum value VLEDMIN. Only when VLED=VLEDMIN, does the control proceed to step 304. Otherwise, the control proceeds to step 1305 which decreases the LED voltage VLED by 1 to turn down the LED 4. Then the control returns to step 1301.

On the other hand, at step 1303, when G=7, the control proceeds to step 1306, so that it is determined whether or not the LED voltage VLED is its maximum value VLEDMAX. Only when VLED=VLEDMAX, does the control proceed to step 304. Otherwise, the control proceeds to step 1307 which increases the LED voltage VLED by 1 to turn up the LED 4. Then, the control returns to step 1301.

Thus, a control range of the gain G of the AGC circuit 101 is substantially increased.

Figure 16:
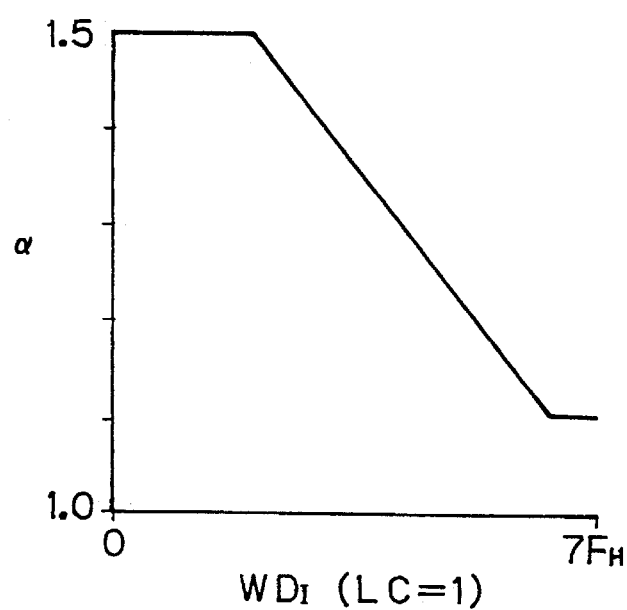
FIG. 16 is a diagram showing the peaking factor α of the circuit of FIG. 15.
Figure 14B:
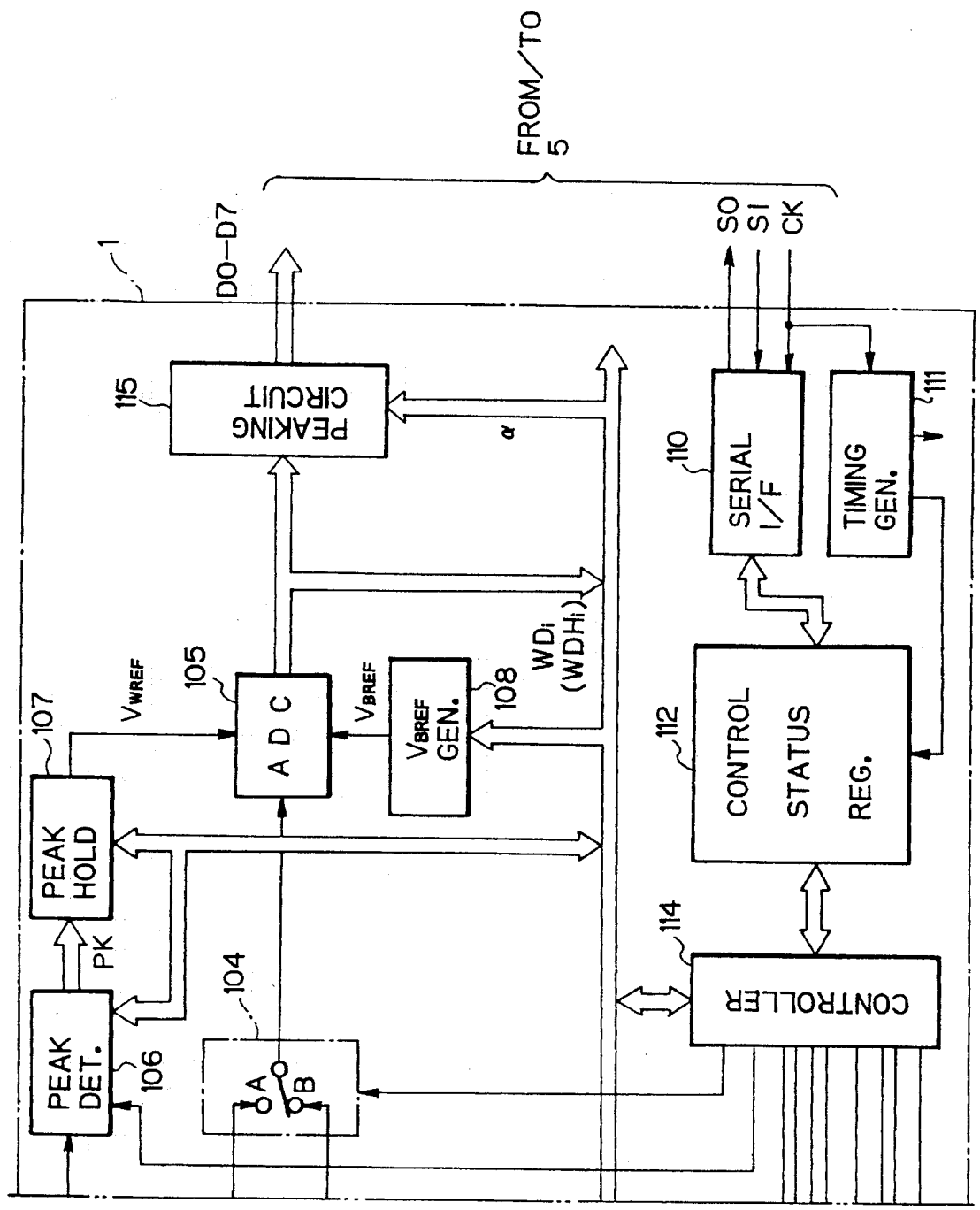
Figure 15:
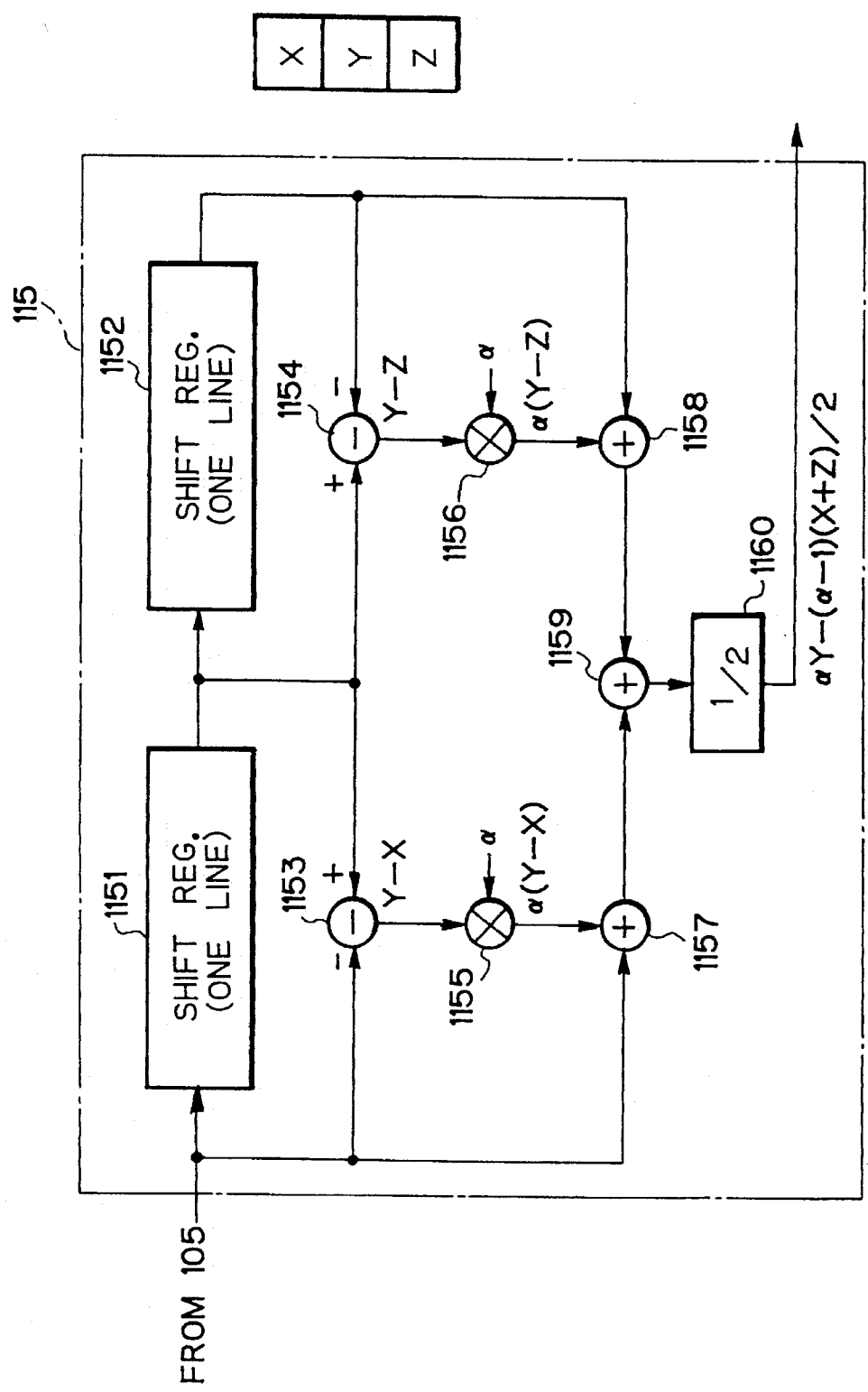
FIG. 15 is a detailed circuit diagram of the peaking circuit of FIG 14.

In FIG. 14, which is a modification of the image signal processing apparatus of FIG. 2, a peaking circuit 115 is added to the elements of FIG. 2. That is, the peaking circuit 115 performs a peaking operation upon a pixel Y using a pixel X after one line of the pixel Y and a pixel Z before one line of the pixel Y. As illustrated in FIG. 15, the peaking circuit 115 includes two shift registers 1151 and 1152 each storing one line, two subtractors 1153 and 1154, two multipliers 1155 and 1156, three adders 1157, 1158 and 1159, and a ½ circuit 1160. As a result, the peaking circuit 115 generates $$\alpha Y-(\alpha-1)(X+Z)/2$$

where $\alpha$ is a peaking factor. The peaking factor $\alpha$ is dependent upon the response characteristic of the image sensor 2. When the response characteristic is larger, the peaking factor $\alpha$ is smaller. Usually, the peaking factor $\alpha$ is 1.1~1.5. For example, the peaking factor $\alpha$ can be calculated by the first value $WD_l$ (LC=1) as shown in FIG. 16.

In the above-described embodiment, although all of the gain G of the AGC circuit 101, the black level correction value and the white level correction value are calculated, it is possible to calculate at least one of the gain G of the AGC circuit 101, the black level correction value and the white level correction value while the others are fixed.

As explained hereinbefore, according to the present invention, an amount of deterioration of the image sensor can be determined by the gain G of the AGC circuit, the defective black level pixel number, the defective white pixel number, and the like. Also, the deterioration of the image sensor can be corrected.

I claim:

1. An image signal processing apparatus for an image sensor associated with a light source, comprising:

an amplifier having a gain G, connected to an output of said image sensor, for amplifying an output signal of said image sensor;

black level correction means, connected to said amplifier, for correcting each pixel of the output signal of said amplifier with a black level correction value, said black level correction means comprising:

a first A/D converter, connected to said amplifier, for performing an A/D conversion of the output signal of said amplifier when the output signal of said image sensor is a black level reference signal;

means for calculating a minimum value of the output signal of said first A/D converter;

means for calculating a black level correction value of a first pixel by subtracting said minimum value from the output signal of said first A/D converter;

means for storing the black level correction value;

means for reading the black level correction value from said storing means;

means for adding the minimum value to the black level correction value;

a D/A converter for performing a D/A conversion of a sum of the black level correction value and the minimum value; and a subtractor, connected to said amplifier and said D/A converter, for subtracting the output signal of said D/A converter from the output signal of pixels subsequent to said first pixel, a second A/D converter, for performing an A/D conversion of an output signal of said subtractor;

means, connected to said second A/D converter and said amplifier, for controlling the gain G of said amplifier so that the output signal of said second A/D converter is brought to a predetermined value, when the output signal of said image sensor is a white level reference signal, said image signal processing apparatus further comprising means for reducing the number of bits of the black level correction value to obtain an effective black level correction value, said storing means storing the effective black level correction value.

2. An image signal processing apparatus for an image sensor associated with a light source, comprising:

an amplifier having a gain G, connected to an output of said image sensor, for amplifying an output signal of said image sensor;

black level correction means, connected to said amplifier, for correcting each pixel of the output signal of said amplifier with a black level correction value, said black level correction means comprising:

a first A/D converter, connected to said amplifier, for performing an A/D conversion of the output signal of said amplifier when the output signal of said image sensor is a black level reference signal;

means for calculating a minimum value of the output signal of said first A/D converter;

means for calculating a black level correction value of a first pixel by subtracting said minimum value from the output signal of said first A/D converter;

means for storing the black level correction value;

means for reading the black level correction value from said storing means;

means for adding the minimum value of the black level correction value;

a D/A converter for performing a D/A conversion of a sum of the black level correction value and the minimum value; and a subtractor, connected to said amplifier and said D/A converter, for subtracting the output signal of said D/A converter from the output signal of pixels subsequent to said first pixel, a second A/D converter, for performing an A/D conversion of an output signal of said subtractor;

means, connected to said second A/D converter and said amplifier, for controlling the gain G of said amplifier so that the output signal of said second A/D converter is brought to a predetermined value, when the output signal of said image sensor is a white level reference signal, said image signal processing apparatus further comprising means for determining whether the black level correction value is smaller than a predetermined value;

means for causing the black level correction value to be the predetermined value when the black level correction value is not smaller than the predetermined value; and means for increasing a defective pixel value in response to the black level correction value being not smaller than the predetermined value.

3. An image signal processing for an image sensor associated with a light source, comprising:

an amplifier having a gain G, connected to an output of said image sensor, for amplifying an output signal of said image sensor;

an A/D converter for performing an A/D conversion of an output signal of said amplifier;

means, connected to said A/D converter and said amplifier, for controlling the gain G of said amplifier so that the output signal of said A/D converter is brought to a predetermined value, when the output signal of said image sensor is a white level reference signal;

black level correction means, connected between said amplifier and said A/D converter, for correcting each pixel of the output signal of said amplifier with a black level correction value; and means, connected to said black level correcting means, for reading an I-th pixel data of each line from the output signal from said black level correcting means after the output signal of said image sensor becomes said white level reference signal, to thereby determine a response characteristic of said image sensor, said black level correction means comprising:

a first A/D converter, connected to said amplifier, for performing an A/D conversion of the output signal of said amplifier when the output signal of said image sensor is a black level reference signal;

means for calculating a minimum value of the output signal of said first A/D converter;

means for calculating a black level correction value of a first pixel by subtracting said minimum value from the output signal of said first A/D converter;

means for storing the black level correction value;

means for reading the black level correction value from said storing means;

means for adding the minimum value to the black level correction value;

a D/A converter for performing a D/A conversion of a sum of the black level correction value and the minimum value; and a subtractor, connected to said amplifier and said D/A converter, for subtracting the output signal of said D/A converter from the output signal of pixels subsequent to said first pixel.

4. An image signal processing apparatus for an image sensor associated with a light source, comprising:

an amplifier having a gain G, connected to an output of said image sensor, for amplifying an output signal of said image sensor;

an A/D converter for performing an A/D conversion of an output signal of said amplifier;

means, connected to said A/D converter and said amplifier, for controlling the gain G of said amplifier so that the output signal of said A/D converter is brought to a predetermined value, when the output signal of said image sensor is a white level reference signal;

black level correction means, connected between said amplifier and said A/D converter, for correcting each pixel of the output signal of said amplifier with a black level correction value;

peak detection means, connected to said black level correction means, for detecting a peak level voltage in an output signal of said black level correction means when the output signal of said image sensor is said white level reference signal; and power supply means, connected to said peak detection means and said A/D converter, for applying said peak level voltage and a low reference voltage lower than said peak level voltage as power supply voltages to said first A/D converter, when the output signal of said image sensor is said white level reference signal, to thereby generate a white level correction value from said A/D converter, said black level correction means comprising:
 a first A/D converter, connected to said amplifier, for performing an A/D conversion of the output signal of said amplifier when the output signal of said image sensor is a black level reference signal;
 means for calculating a minimum value of the output signal of said first A/D converter;
 means for calculating a black level correction value of a first pixel by subtracting said minimum value from the output signal of said first A/D converter;
 means for storing the black level correction value;
 means for reading the black level correction value from said storing means;
 means for adding the minimum value to the black level correction value;
 a D/A converter for performing a D/A conversion of a sum of the black level correction value and the minimum value; and
 a subtractor, connected to said amplifier and said D/A converter, for subtracting the output signal of said D/A converter from the output signal of pixels subsequent to said first pixel.

5. An apparatus as set forth in claim 4, further comprising:

means for determining whether the white level correction value is 0; and means for increasing a defective white pixel value in response to the white level correction value being 0.

6. An apparatus as set forth in claim 4, further comprising:

white level correction means, connected between said black level correction means and said A/D converter, for correcting the output signal of said black level correction means with the white level correction value; and switch means, connected to said black level correction means, said white correction means, and said A/D converter, for connecting said white level correction means to said A/D converter when said white level correction means is operated, and for connecting said black level correction means to said A/D converter when said white level correction means is not operated.

7. An apparatus as set forth in claim 6, wherein said white level correction means comprises:

converting means for converting the white level correction value to a corrected value $$\frac{PK}{PK0 + WDH_i}$$

where PK is the peak level voltage,

PK0 is the low reference voltage, and $WDH_i$ is the white level correction value; and an analog multiplier, connected to said black level correction means and said converting means, for multiplying the output signal of said black level correction means by the corrected value.

8. An apparatus as set forth in claim 3, further comprising a peaking circuit, connected to said first A/D converter, for performing a peaking operation upon an output signal of said first A/D converter with a peaking factor dependent upon the response characteristic of said image sensor.

9. An image signal processing apparatus for an image sensor, comprising:

an amplifier, connected to an output of said image sensor, for amplifying an output signal of said image sensor;

black level correction means, connected to said amplifier, for correcting each pixel of the output signal of said amplifier with a black level correction value, said black level correction means comprising:
 a first A/D converter, connected to said amplifier, for performing an A/D conversion of the output signal of said amplifier when the output signal of said image sensor is a black level reference signal;
 means for calculating a minimum value of the output signal of said first A/D converter;
 means for calculating a black level correction value of a first pixel by subtracting said minimum value from the output signal of said first A/D converter;
 means for storing the black level correction value;
 means for reading the black level correction value from said storing means;
 means for adding the minimum value to the black level correction value;
 a D/A converter for performing a D/A conversion of a sum of the black level correction value and the minimum value; and
 a subtractor, connected to said amplifier and said D/A converter, for subtracting the output signal of said D/A converter from the output signal of pixels subsequent to said first pixel;

a second A/D converter, for performing an A/D conversion of an output signal of said subtractor.

10. An apparatus as set forth in claim 9, further comprising means for reducing the number of bits of the black level correction value to obtain an effective black level correction value, said storing means storing the effective black level correction value.

11. An apparatus as set forth in claim 9, further comprising:

means for determining whether the black level correction value is smaller than a predetermined value;

means for causing the black level correction value to be the predetermined value when the black level correction value is not smaller than the predetermined value; and means for increasing a defective pixel value in response to the black level correction value being not smaller than the predetermined value.

12. An apparatus as set forth in claim 9, further comprising means, connected to said black level correcting means, for reading an I-th pixel data of each line from the output signal from said black level correcting means after the output signal of said image sensor becomes said white level reference signal, to thereby determine a response characteristic of said image sensor.

13. An apparatus as set forth in claim 9, further comprising:

peak detection means, connected to said black level correction means, for detecting a peak level voltage in an output signal of said black level correction means when the output signal of said image sensor is said white level reference signal; and power supply means, connected to said peak detection means and said second A/D converter, for applying said peak level voltage and a low reference voltage lower than said peak level voltage as power supply voltages to said second A/D converter, when the output signal of said image sensor is said white level reference signal, to thereby generate a white level correction value from said second A/D converter.

14. An apparatus as set forth in claim 13, further comprising: means for determining whether the white level correction value is 0; and means for increasing a defective white pixel value in response to the white level correction value being 0.

15. An apparatus as set forth in claim 13, further comprising:

white level correction means, connected between said black level correction means and said second A/D converter, for correcting the output signal of said black level correction means with the white level correction value; and switch means, connected to said black level correction means, said white correction means, and said second A/D converter, for connecting said white level correction means to said second A/D converter when said white level correction means is operated, and for connecting said black level correction means to said second A/D converter when said white level correction means is not operated.

16. An apparatus as set forth in claim 15, wherein said white level correction means comprises:

converting means for converting the white level correction value to a corrected value $$\frac{PK}{PK0 + WDH_i}$$

where PK is the peak level voltage,
PK0 is the low reference voltage, and
$WDH_i$ is the white level correction value; and an analog multiplier, connected to said black level correction means and said converting means, for multiplying the output signal of said black level correction means by the corrected value.

17. An apparatus as set forth in claim 12, further comprising a peaking circuit, connected to said second A/D converter, for performing a peaking operation upon an output signal of said second A/D converter with a peaking factor dependent upon the response characteristic of said image sensor.

18. An image signal processing apparatus for an image sensor, comprising:

an amplifier, connected to an output of said image sensor, for amplifying an output signal of said image sensor;

an A/D converter, connected to said amplifier, for performing an A/D conversion upon an output signal of said amplifier;

peak detection means, connected to said amplifier, for detecting a peak level voltage in an output signal of said amplifier when the output signal of said image sensor is a white level reference signal;

power supply means, connected to said peak detection means and said A/D converter, for applying said peak level voltage and a low reference voltage lower than said peak level voltage as power supply voltages to said A/D converter, when the output signal of said image sensor is said white level reference signal, to thereby generate a white level correction value from said A/D converter, and black level correction means, connected to said amplifier, for correcting each pixel of the output signal of said amplifier with a black level correction value, said black level correction means comprising:

a first A/D converter, connected to said amplifier, for performing an A/D conversion of the output signal of said amplifier when the output signal of said image sensor is a black level reference signal;

means for calculating a minimum value of the output signal of said first A/D converter;

means for calculating a black level correction value of a first pixel by subtracting said minimum value from the output signal of said first A/D converter;

means for storing the black level correction value;

means for reading the black level correction value from said storing means;

means for adding the minimum value to the black level correction value;

a D/A converter for performing a D/A conversion of a sum of the black level correction value and the minimum value; and a subtractor, connected to said amplifier and said D/A converter, for subtracting the output signal of said D/A converter from the output signal of pixels subsequent to said first pixel.

19. An apparatus as set forth in claim 18, further comprising:

means for determining whether the white level correction value is 0; and means for increasing a defective white pixel value in response to the white level correction value being 0.

20. An apparatus as set forth in claim 18, further comprising:

white level correction means, connected between said amplifier and said A/D converter, for correcting the output signal of said amplifier correction means with the white level correction value; and switch means, connected to said white correction means and said A/D converter, for connecting said white level correction means to said A/D converter when said white level correction means is operated and for connecting said amplifier to said black level correction means when said white level correction means is not operated.

21. An apparatus as set forth in claim 20, wherein said white level correction means comprises:

converting means for converting the white level correction value to a corrected value $$\frac{PK}{PK0 + WDH_i}$$

where PK is the peak level voltage,
PK0 is the low reference voltage, and
$WDH_i$ is the white level correction value; and an analog multiplier, connected to said black level correction means and said converting means, for multiplying the output signal of said black level correction means by the corrected value.

22. An apparatus as set forth in claim 18, further comprising means, connected to said black level correcting means, for reading an I-th pixel data of each line from the output signal from said black level correcting means after the output signal of said image sensor becomes said white level reference signal, to thereby determine a response characteristic of said image sensor.

23. An apparatus as set forth in claim 22, further comprising a peaking circuit, connected to said A/D converter, for performing a peaking operation upon an output signal of said A/D converter with a peaking factor dependent upon the response characteristic of said image sensor.

* * * * *